(12) United States Patent
Fei et al.

(10) Patent No.: US 12,282,936 B1
(45) Date of Patent: *Apr. 22, 2025

(54) OMNI-CHANNEL DIGITAL COUPON CLIPPING AND REDEMPTION

(71) Applicant: WALGREEN CO., Deerfield, IL (US)

(72) Inventors: Jason Fei, Long Grove, IL (US); Rosie Bu, Buffalo Grove, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,936

(22) Filed: Dec. 14, 2023

Related U.S. Application Data

(63) Continuation of application No. 17/390,490, filed on Jul. 30, 2021, now Pat. No. 11,861,651, which is a continuation of application No. 15/411,330, filed on Jan. 20, 2017, now Pat. No. 11,120,465.

(51) Int. Cl.
  *G06Q 30/00* (2023.01)
  *G06K 7/08* (2006.01)
  *G06Q 30/0207* (2023.01)
  *G06Q 30/0238* (2023.01)

(52) U.S. Cl.
  CPC ......... *G06Q 30/0238* (2013.01); *G06K 7/082* (2013.01); *G06Q 30/0222* (2013.01); *G06Q 30/0225* (2013.01)

(58) Field of Classification Search
  None
  See application file for complete search history.

(56) References Cited

U.S. PATENT DOCUMENTS

| | | | |
|---|---|---|---|
| 8,788,323 B2 * | 7/2014 | Weiss | G06Q 30/0224 705/14.1 |
| 9,135,612 B1 | 9/2015 | Proctor, Jr. et al. | |
| 9,697,507 B2 | 7/2017 | Mariotti | |
| 9,866,749 B2 | 1/2018 | Relf | |
| 2002/0065714 A1 | 5/2002 | Goodwin | |
| 2008/0228568 A1 * | 9/2008 | Williams | G06Q 30/0277 705/14.66 |
| 2008/0262928 A1 | 10/2008 | Michaelis | |
| 2009/0125396 A1 | 5/2009 | Otto et al. | |

(Continued)

OTHER PUBLICATIONS

"Coupons Help—Walgreens", 2015, www.Walgreens.com (printed through www.archive.org) (Year: 2015).*

(Continued)

*Primary Examiner* — Naresh Vig
(74) *Attorney, Agent, or Firm* — MARSHALL, GERSTEIN & BORUN LLP

(57) ABSTRACT

An omni-channel coupon system may link electronic coupons across several couponing channels by storing the electronic coupons in association with a user profile or loyalty account. A user may clip electronic coupons from several couponing channels, such as a mobile application, retail web page, social networking web page, email, short message service (SMS) message, a physical coupon, a manufacturer/third-party web page or other affiliated web page, a manufacturer/third-party application, etc. Each clipped electronic coupon may be stored with a user profile for the user. When the user purchases products or items at an online or retail store, the electronic coupons may be retrieved from the user profile and redeemed.

20 Claims, 15 Drawing Sheets

(56) References Cited

U.S. PATENT DOCUMENTS

| | | |
|---|---|---|
| 2010/0312630 A1 | 12/2010 | Krutchik et al. |
| 2011/0093344 A1 | 4/2011 | Burke et al. |
| 2011/0106613 A1 | 5/2011 | Felt et al. |
| 2011/0251897 A1 | 10/2011 | Litvack et al. |
| 2011/0254972 A1 | 10/2011 | Yaguchi |
| 2012/0047003 A1 | 2/2012 | Hammad et al. |
| 2012/0084122 A1 | 4/2012 | Boehle |
| 2012/0136712 A1 | 5/2012 | Chang et al. |
| 2012/0143666 A1* | 6/2012 | Carrion ............... G06Q 30/02 705/14.23 |
| 2012/0150634 A1 | 6/2012 | Shimpa et al. |
| 2012/0220277 A1* | 8/2012 | Gonynor ............... G06Q 30/02 455/414.2 |
| 2013/0103539 A1 | 4/2013 | Abraham et al. |
| 2013/0108122 A1 | 5/2013 | Ptucha |
| 2013/0132183 A1* | 5/2013 | Klein ............... G06Q 30/0207 705/14.36 |
| 2013/0238413 A1 | 9/2013 | Carlson et al. |
| 2013/0275197 A1 | 10/2013 | Thibedeau et al. |
| 2013/0304555 A1* | 11/2013 | Groarke ............ G06Q 30/0207 705/14.23 |
| 2013/0311262 A1 | 11/2013 | Hirson |
| 2013/0332283 A1 | 12/2013 | Faith et al. |
| 2013/0339115 A1 | 12/2013 | Soldate |
| 2014/0006132 A1 | 1/2014 | Barker |
| 2014/0058823 A1 | 2/2014 | Ross et al. |
| 2014/0058834 A1 | 2/2014 | Liberty et al. |
| 2014/0067512 A1 | 3/2014 | Hanson et al. |
| 2014/0172532 A1 | 6/2014 | Choi et al. |
| 2015/0134431 A1 | 5/2015 | Georgoff et al. |
| 2016/0012465 A1 | 1/2016 | Sharp |
| 2016/0267512 A1 | 9/2016 | Misra et al. |
| 2018/0341982 A1 | 11/2018 | Gotoh |
| 2019/0205876 A1 | 7/2019 | James et al. |

OTHER PUBLICATIONS

Napean LLC YouTube video "Walgreen boosts mobile strategy with aisle411 integration", Jul. 17, 2012, Napean LLC (Year: 2012).*
Non-Final Office Action, U.S. Appl. No. 15/729,279, mailed Jun. 14, 2018.
U.S. Appl. No. 13/650,766 dated Oct. 12, 2012.
U.S. Appl. No. 14/930,380 dated Nov. 2, 2015.
U.S. Appl. No. 15/376,082 dated Dec. 12, 2016.
U.S. Appl. No. 15/376,219 dated Dec. 12, 2016.
Office Action for U.S. Appl. No. 15/411,330, dated Nov. 7, 2018.
Office Action for U.S. Appl. No. 15/411,330, dated Apr. 22, 2019.
Rebecca Robbins, "At Walgreens and CVS a Push to Collect Customer Health Data by Dangling Discounts", Nov. 23, 2015, StatNews (Year: 2015).
New Paperless Digital Coupons at Walgreens, Feb. 10, 2014, The Crazy Coupon Lady (Year: 2014).
Walgreens Steps with Balance Rewards: Get Rewarded for Walking, Jan. 8, 2015, The Crazy Coupon Lady (Year: 2015).
Office Action for U.S. Appl. No. 15/411,330, dated Aug. 1, 2019.
TheCouponBoutique—Order Confirmation Page, Sep. 24, 2015, The CouponBoutique (Year: 2015).
Office Action for U.S. Appl. No. 15/411,330, dated Nov. 15, 2019.
Office Action for U.S. Appl. No. 15/411,330, dated Mar. 11, 2020.
Vangie Beal, All about widgets, Sep. 14, 2007, webopedia.com <http://webopedia.com> (Year: 2007).
Office Action for U.S. Appl. No. 15/411,330, dated Sep. 9, 2020.
Office Action for U.S. Appl. No. 15/411,330, dated Jan. 26, 2021.
Office Action for U.S. Appl. No. 17/390,490, dated Mar. 20, 2023.
Office Action for U.S. Appl. No. 17/390,490, dated Sep. 22, 2022.

* cited by examiner

OMNI-CHANNEL DIGITAL COUPON CLIPPING AND REDEMPTION

CROSS-REFERENCE TO RELATED APPLICATIONS

This application is a continuation of and claims priority to U.S. application Ser. No. 17/390,490 filed on Jul. 30, 2021, entitled "Omni-Channel Digital Coupon Clipping and Redemption," which is a continuation of and claims priority to U.S. application Ser. No. 15/411,330 filed on Jan. 20, 2017, entitled "Omni-Channel Digital Coupon Clipping and Redemption," the entire contents of each of which are hereby expressly incorporated by reference.

TECHNICAL FIELD

The present disclosure generally relates to a system and method for linking electronic coupons across couponing channels and, more particularly to associating electronic coupons with a user profile for redeeming the electronic coupons obtained from several channels.

BACKGROUND

Coupons are widely used by a variety of retailers to entice customers into purchasing goods and services. Redemption of coupons is typically performed at the point of sale by handing a piece of paper to the cashier. Typically, the cashier will type in, scan, or otherwise enter a code associated with the coupon (e.g., a barcode on the piece of paper) and then applying the special deal being offered to the bearer of the coupon (e.g., a discounted price, buy one get one free, a gift of some other item or service, etc.). In the past, redeeming a coupon at the point of sale at a brick and mortar store required a piece of paper which was taken by the cashier at the point of sale. More recently, mobile devices have given users the ability to display a code (e.g., one dimensional barcode, two dimensional barcode, alphanumeric code, etc.) on the display of the mobile device and this code can be entered by the cashier or at a self-checkout machine to redeem the special deal.

In some scenarios, coupons obtained from one couponing channel (e.g., a mobile application) are not seamlessly integrated with coupons obtained from another couponing channel (e.g., a web page). As a result, a user may need to display codes on several devices and/or from several different sources to redeem the special deals.

SUMMARY

To integrate electronic coupons obtained from several couponing channels (e.g., a mobile application, a retail web page, a social networking page, a physical coupon, an email, a short message service (SMS) message, a manufacturer/third-party web page or other affiliated web page, a manufacturer/third-party application, etc.), an omni-channel coupon system associates each electronic coupon obtained by a user with a user profile (e.g., a loyalty account). When the user selects an electronic coupon, the omni-channel coupon system may request that the user provides user identification information for retrieving the user profile (e.g., a loyalty account number, a user identification number (user ID), a username, a password, a personal identification number (PIN), a passcode, an email address, a phone number, etc.). The user identification information is then verified by comparing the user identification information to stored user identification information for stored user profiles. When the matching user profile is identified, the omni-channel coupon system may store the selected electronic coupon with the user profile. In this manner, when the user purchases products at a retail store or an online store, the omni-channel coupon system may obtain each of the electronic coupons stored in the user profile and present the electronic coupons to the user. The user may then select the electronic coupon that she wants to redeem and then the offer associated with the electronic coupon may be applied to the user's purchase.

In some embodiments, the omni-channel coupon system may automatically apply offers for each electronic coupon which corresponds to a product being purchased by the user (also referred to herein as an "item"). For example, upon receiving user identification information and indications of the products being purchased by the user (e.g., via a point-of-sale (POS) terminal), the omni-channel coupon system may compare product identifiers for each of the products to product identifiers which correspond to the electronic coupons stored in the user profile. When there is a match, the omni-channel coupon system may automatically apply the offer associated with the matching electronic coupon or may prompt the user to confirm that the electronic coupon should be redeemed.

The present embodiments advantageously improve upon conventional mobile couponing systems by allowing users to access electronic coupons from several couponing channels (e.g., a mobile application, a retail web page, a social networking page, a physical coupon, an email, a short message service (SMS) message, a manufacturer/third-party web page or other affiliated web page, a manufacturer/third-party application, etc.) and allowing the users to store each of the electronic coupons at a single location (e.g., with a user profile). A user may then redeem an electronic coupon from a different client device than the client device which obtained the electronic coupon. Moreover, the present embodiments advantageously allow for electronic coupons to automatically be redeemed without requiring the user to retrieve the electronic coupon or even remember that she previously clipped the electronic coupon. In this manner, the omni-channel coupon system seamlessly integrates electronic coupons clipped from several couponing channels and redeems the electronic coupons without requiring the user to keep track of which offers may apply to which purchases. Accordingly, a user may clip each electronic coupon once from any of several couponing channels and the electronic coupons may automatically be applied to any purchase channel (e.g., at a retail store, online store, etc.).

In one embodiment, a computer-implemented method for linking electronic coupons across a plurality of couponing channels includes providing to a client device of a user, a set of electronic coupons where each of the electronic coupons includes a coupon identifier and is associated with an offer, receiving a selection of one of the set of electronic coupons from the user, and receiving user identification information from the user for retrieving a user profile. The method further includes comparing the user identification information to stored user identification information to identify a matching user profile and storing the selected electronic coupon with the user profile for the user, where the user profile includes one or more electronic coupons obtained from one or more couponing channels. When the user purchases an item corresponding to the selected electronic coupon, the method includes applying the offer associated with the selected electronic coupon and providing an order confirmation page to the user including an indication of the applied offer.

In another embodiment, a system for linking electronic coupons across a plurality of couponing channels is provided. The system includes one or more processors, a communication network and a non-transitory computer-readable memory coupled to the one or more processors, and the communication network and storing instructions thereon. When executed by the one or more processors, the instructions cause the system to provide, via the communication network to a client device of a user, a set of electronic coupons where each of the electronic coupons includes a coupon identifier and is associated with an offer, receive a selection of one of the set of electronic coupons from the user, receive user identification information from the user for retrieving a user profile, and compare the user identification information to stored user identification information to identify a matching user profile. The instructions further cause the system to store the selected electronic coupon with the user profile for the user, where the user profile includes one or more electronic coupons obtained from one or more couponing channels. When the user purchases an item corresponding to the selected electronic coupon, the instructions cause the system to apply the offer associated with the selected electronic coupon and provide, via the communication network, an order confirmation page to the user including an indication of the applied offer.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3A depicts an embodiment of a coupon retrieval page associated with a website in accordance with the presently described embodiments;

FIG. 3B depicts an embodiment of a user log in page associated with a website in accordance with the presently described embodiments;

DETAILED DESCRIPTION

Figure 1A:
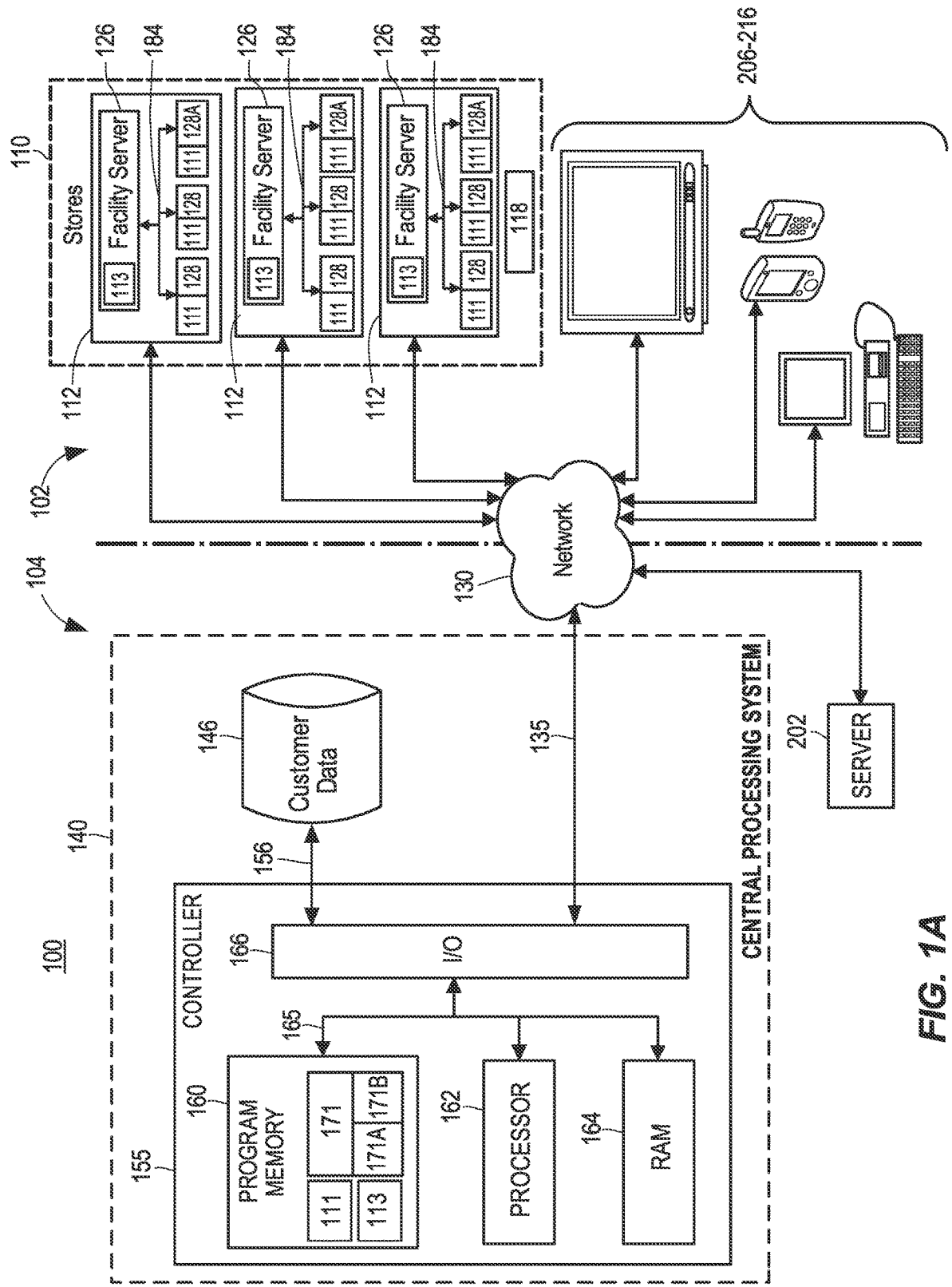
FIG. 1A illustrates a block diagram of a computer network and system on which an exemplary omni-channel coupon system and method may operate in accordance with the described embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112 (f).

Accordingly, as used herein, the term "couponing channel" may refer to any medium from which an electronic coupon may be obtained. A couponing channel may include a mobile application, a retail web page, a social networking page, a physical coupon, an email, an SMS message, a manufacturer/third-party web page or other affiliated web page, a manufacturer/third-party application, etc.

Generally speaking, techniques for linking electronic coupons across a plurality of couponing channels may be implemented in a client device, one or several network servers, a POS terminal, or a system that includes a combination of these devices. However, for clarity, the examples below focus primarily on an embodiment in which a server provides a set of electronic coupons to user's client device, such as a laptop computer, desktop computer, smart-phone, etc. The user may select one of the electronic coupons via a user control on the client device and an indication of the selected electronic coupon may be transmitted to the server along with user identification information for retrieving a user profile. The server then may store the selected electronic coupon in the user profile for the user. When the user purchases a product, a product identifier for the product may be obtained at a POS terminal or the user's client device. The server may provide the electronic coupons stored in the user profile to the client device or the POS terminal or may provide a subset of the electronic coupons stored in the user profile which correspond to products being purchased by the user. Then the server, client device, or the POS terminal may apply offers associated with coupons for products included in the user's purchase. The server may then generate and transmit an order confirmation page including an indication of the applied offers to the POS terminal and/or the client device.

FIG. 1A illustrates various aspects of an exemplary architecture implementing an omni-channel coupon system 100. The high-level architecture includes both hardware and software applications, as well as various data communications channels for communicating data between the various hardware and software components. The omni-channel coupon system 100 may be roughly divided into front-end components 102 and back-end components 104. The front-end components 102 are primarily disposed within a retail network 110 including one or more stores 112. The stores 112 may be located, by way of example rather than limitation, in separate geographic locations from each other, including different areas of the same city, different cities, or even different states. The front-end components 102 comprise a number of POS terminals 128. The POS terminals 128 are local computers located in the various stores 112 throughout the retail network 110 and executing various checkout or cashier applications such as accepting payment and redeeming coupons (discussed below). The POS terminals 128 may be a checkout counter or lane situated in a fixed location in the store 112 where an employee uses a checkout terminal to total the customer's desired purchases and accept payment, mobile checkout terminals that can be brought to a customer for convenient on-the-spot payment, an automated self-checkout terminal where a customer can total his or her own purchases and pay the self-checkout terminal, etc. The stores 112 may be any of several kinds of retailers such as retail pharmacies, grocery stores, clothing stores, general retail stores, specialty retail stores, etc. or any other place where a POS terminal 128 can be used to total a customer's desired purchases and accept payment. The retail network 110 may also include one or more warehouses or central-filling facilities 118. The warehouses or central-filling facilities 118 may distribute medications or retail products to the various stores 112 in the retail network 110, or may distribute medications or retail products directly to customers.

Client devices 206-216 (e.g., a thin-client device, a tablet computer, a web-enabled cell phone, a personal digital assistant (PDA), a mobile device smart-phone also referred to herein as a "mobile device," a laptop computer, a desktop computer, a portable media player, a wearable computing device such as Google Glass™, etc.) may be communicatively connected to the stores 112 and to a system 140 through a digital network 130, as described below.

Those of ordinary skill in the art will recognize that the front-end components 102 could also comprise a plurality of facility servers 126 disposed at the plurality of stores 112 instead of, or in addition to, a plurality of POS terminals 128. Each of the stores 112 may include one or more facility servers 126 that may facilitate communications between the POS terminals 128 of the stores 112 via a digital network 130. Of course, a local digital network 184 may also operatively connect each of the POS terminals 128 to the facility server 126. Unless otherwise indicated, any discussion of the POS terminals 128 also refers to the facility servers 126, and vice versa. Moreover, environments other than the stores 112 may employ the POS terminals 128 and the servers 126. As used herein, the term "store" refers to any of these environments (e.g., vending machine, call centers, kiosks, Internet interface terminals, etc.) in addition to the retail stores 112, etc. described above. Accordingly, in some embodiments a store 112 is a brick and mortar store or some other retail establishment with a physical presence with which the customer interacts, but in other embodiments a store 112 may be a store web page (e.g., an online store).

The front-end components 102 communicate with the back-end components 104 via the digital network 130. One or more of the front-end components 102 may be excluded from communication with the back-end components 104 by configuration or by limiting access due to security concerns. For example, the client devices 206-216 may be excluded from direct access to the back-end components 104. In some embodiments, the stores 112 may communicate with the back-end components via the digital network 130. In other embodiments, the stores 112 and client devices 206-216 may communicate with the back-end components 104 via the same digital network 130, but digital access rights, IP masking, and other network configurations may deny access to the client devices 206-216.

The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. In addition to one or more servers 202 (described below), the back-end components 104 include the central processing system 140 within a central processing facility, such as, for example, the central processing facility described in U.S. Pat. No. 8,175,891 entitled "DISTRIBUTED PHARMACY PRESCRIPTION PROCESSING SYSTEM" the entire disclosure of which is incorporated by reference herein. Of course, the stores 112 may be communicatively connected to different back-end components 104 having one or more functions or capabilities that are similar to the central processing system 140. The central processing system 140 may include one or more computer processors 162 adapted and configured to execute various software applications and components of the omni-channel coupon system 100, in addition to other software applications. The central processing system 140 further includes a database 146. The database 146 is adapted to store data related to the operation of the omni-channel coupon system (e.g., user profiles, user or customer preferences, user purchase history, coupons offered, a history of coupons clipped by customers and coupons redeemed by customers, a history of coupons clipped by a particular user and coupons redeemed by the particular user, etc.). The central processing system 140 may access data stored in the database 146 when executing various functions and tasks associated with the operation of the omni-channel coupon system 100.

Although FIG. 1A depicts the omni-channel coupon system 100 as including the central processing system 140 in communication with three stores 112, and various client devices 206-216 it should be understood that different numbers of processing systems, stores, and devices may be utilized. For example, the digital network 130 (or other digital networks, not shown) may interconnect the central processing system 140 to a plurality of included central processing systems 140, hundreds of stores 112, and thousands of client devices 206-216. According to the disclosed example, this configuration may provide several advantages, such as, for example, enabling near real-time uploads and downloads of information as well as periodic uploads and downloads of information. This provides for a primary backup of all the information generated in the omni-channel coupon process.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 includes a program memory 160, the processor 162 (may be called a microcontroller or a microprocessor), a random-access memory (RAM) 164, and the input/output (I/O) circuit 166, all of which are interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

The program memory 160 may also contain machine-readable instructions (i.e., software) 171, for execution by the processor 162. The software 171 may perform the various tasks associated with operation of the store or stores, and may be a single module 171 or a plurality of modules 171A, 171B. While the software 171 is depicted in FIG. 1A as including two modules, 171A and 171B, the software 171 may include any number of modules accomplishing tasks related to retail operation including, for example, inventory management, payment processing, coupon redemption, etc. The central processing system 140 implements a server application 113 for providing data to a user interface application 111 operating on the POS terminals 128.

Figure 1B:
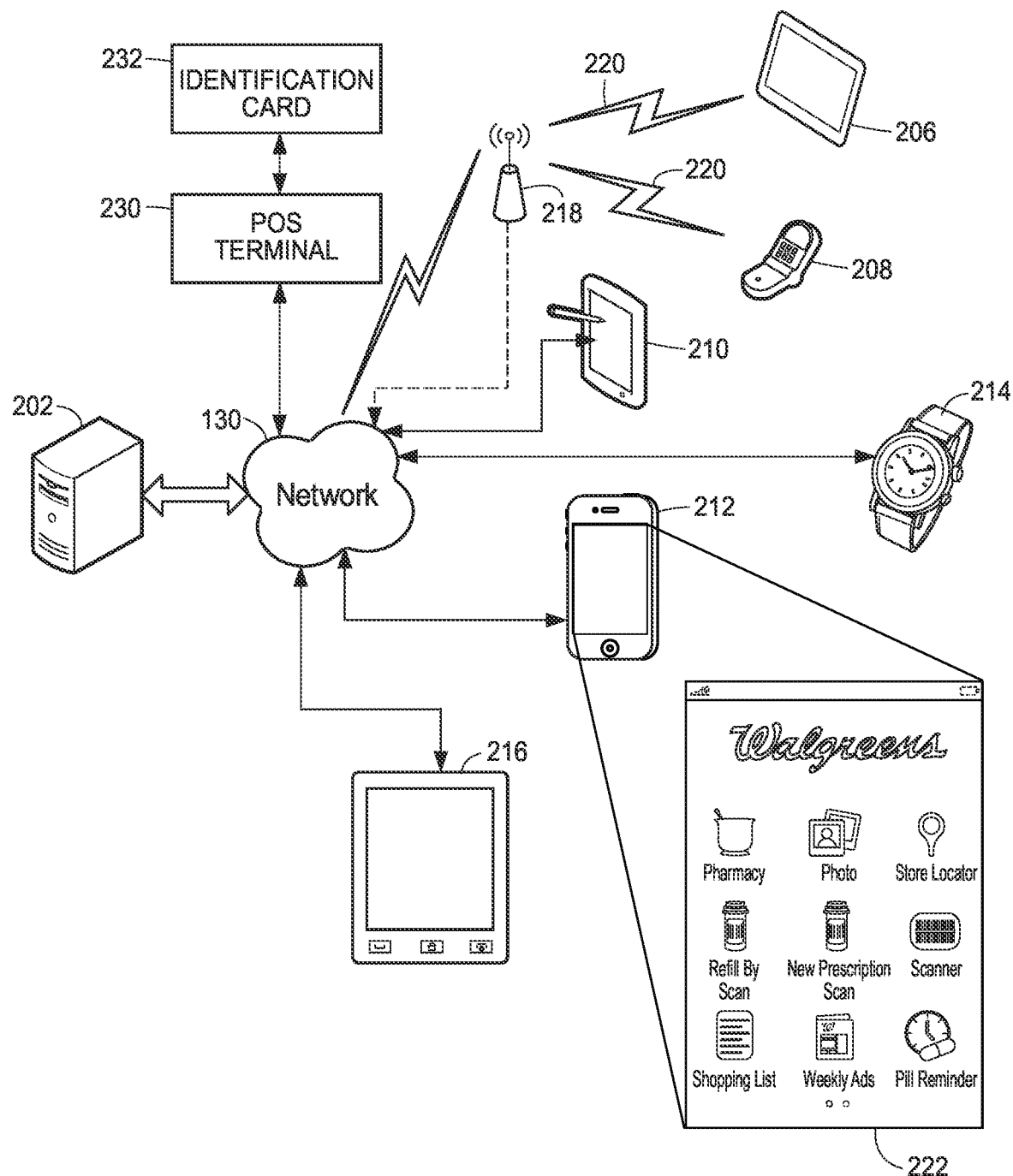
FIG. 1B illustrates client devices and associated equipment that may operate with a network and a server.

For purposes of implementing the omni-channel coupon system 100, a user interacts with the server 202 and the store systems (e.g., the central processing system 140) via a client device 206-216 (e.g., mobile device application, etc.). FIG. 1B depicts the server 202 connected via the network 130 to the client devices 206-216 through which a user may initiate and interact with the omni-channel coupon system 100 (as shown in FIG. 1A). The client devices 206-216 may include, by way of example, a tablet computer 206, an internet-enabled cell phone 208, a PDA 210, a mobile device 212, a watch or other wearable computer 214, a thin-client device 216, a portable media player (not shown), etc. Of course, any client device appropriately configured may interact with the omni-channel coupon system 100. A thin-client device 216 is a client device that depends on a master computing device (e.g., a server, a mainframe computer, etc.) to which it is connected through a network interface. A thin-client device 216 may depend on the server 202 to handle many functions that are performed locally by traditional computing systems (e.g., data storage and access, data processing). For example, a thin-client device 216 may merely act as a remote input/output device that accepts user input and transmits the input to the server 202. Then, the server 202 may process the input and transmit output as well as accessing or storing data as needed. Thus, the thin-client device 216 could be a more streamlined device, requiring only an input device (e.g., a touch-screen), an output device (e.g., a touch-screen), networking capability (e.g., a transmitter and receiver), and the necessary software to accept input, relay it to the server, and accept and display output. Of course, a thin-client device 216 may perform a larger number of processes locally and leave only a few functions (e.g., data persistence) for the server 202 to perform.

In some embodiments, the user may also interact with the server 202 via a POS terminal 230 similar to the POS terminals 128 as shown in FIG. 1A. In some embodiments, the user may provide an identification card 232 such as a loyalty card to the POS terminal 230. The identification card 232 may include a magnetic stripe, electronic circuit such as an electronic chip, radio-frequency identification (RFID) tag, or any other suitable mechanism for transmitting user identification information, such as a loyalty or customer account number to the POS terminal 230. The POS terminal 230 may then transmit the user identification information to the server 202 which may retrieve a user profile corresponding to the user identification information. In other embodiments, the user may manually enter user identification information at the POS terminal 230.

The client devices 206-216 need not necessarily communicate with the network 130 via a wired connection. In some instances, the client devices 206-216 may communicate with the network 130 via wireless signals 220 and, in some instances, may communicate with the network 130 via an intervening wireless or wired device 218, which may be a wireless router, a wireless repeater, a base transceiver station of a mobile telephony provider, etc. Each of the client devices 206-216 may interact with the server 202 to receive web pages or server data from the server 202 and may display the web pages or server data via a client application (described below). For example, the mobile device 212 may display a home screen 222 (i.e., the root or start page at which users enter the client application) of the client application to a user, may receive an input from the user, and may interact with the server 202 depending on the type of user-specified input. It will be appreciated that although only one server 202 is depicted in FIG. 1B, multiple servers 202 may be provided for the purpose of distributing server load, serving different web pages, implementing different portions of the store web interface, etc. These multiple servers 202 may include a web server, an entity-specific server (e.g. an Apple®) server, etc.), a server that is disposed in a retail or proprietary network, an independent third-party server that is not under the control of the entity, etc. For example, the server 202 may interact with several manufacturer servers and/or coupon generation servers which generate and transmit electronic coupons to the server 202.

Figure 1C:
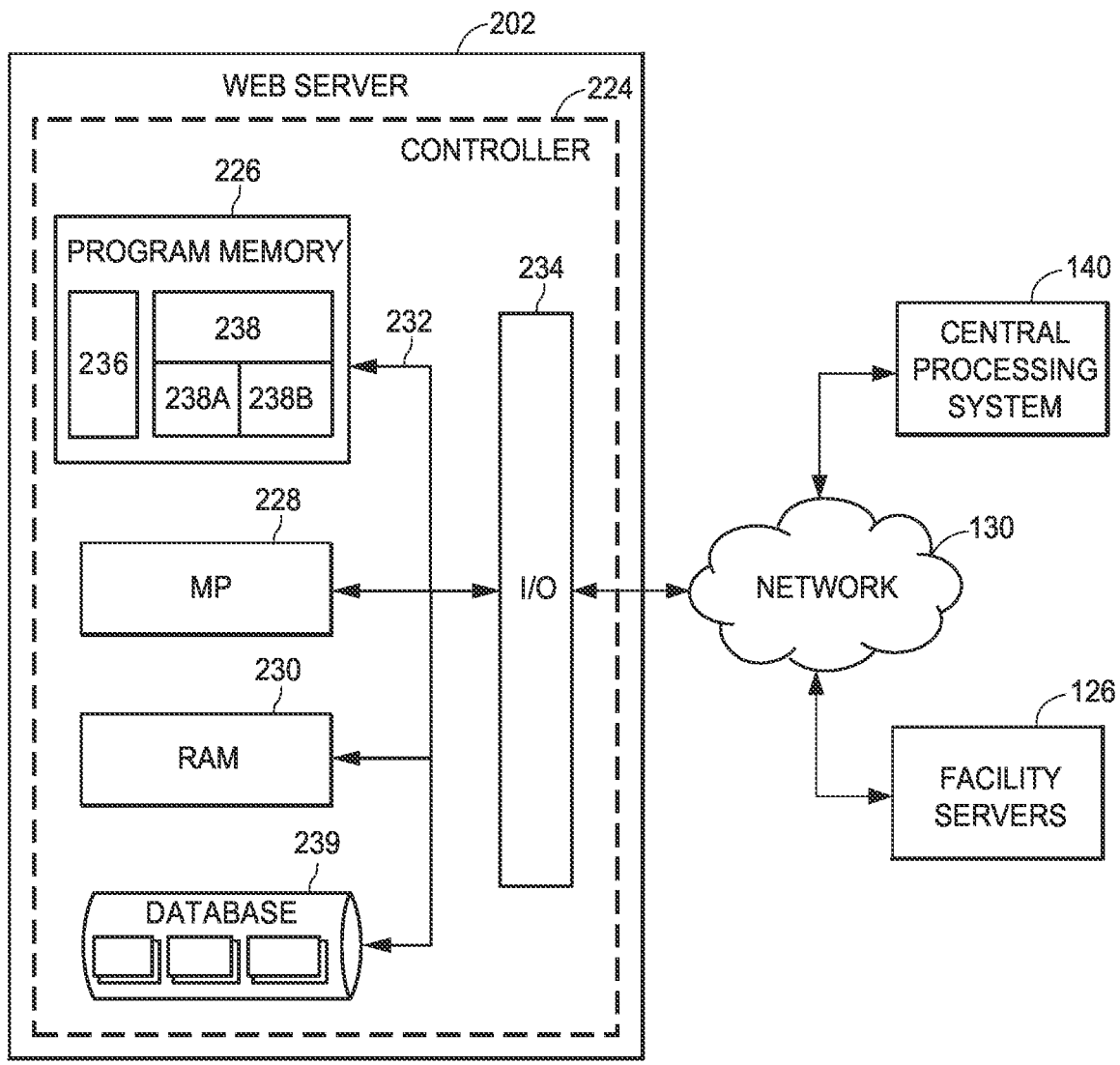
FIG. 1C illustrates a block diagram of an exemplary server.

Turning now to FIG. 1C, the server 202, like the facility server 126, includes a controller 224. Similar to the controller 155, the controller 224 includes a program memory 226, a microcontroller or a microprocessor (MP) 228, a random-access memory (RAM) 230, and an input/output (I/O) circuit 234, all of which are interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as available coupons, customer or user profiles, customer or user preferences, product data, mobile device application data, web page templates and/or web pages, and other data necessary to interact with the user through the network 130. As discussed with reference to the controller 155, it should be appreciated that although FIG. 1C depicts only one microprocessor 228, the controller 224 may include multiple microprocessors 228. Similarly, the memory of the controller 224 may include multiple RAMs 230 and multiple program memories 226. Although FIG. 1C depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the client devices 206-216 and the POS terminal 230, as depicted in FIG. 1B, FIG. 1C illustrates that the server 202 may also be connected through the network 130 to the central processing system 140 and/or one or more facility servers 126. As described below, the connection of the server 202 to the central processing system 140 assists in facilitating some of the functionality of the omni-channel coupon process. As a result, the server 202 may act as a routing or interfacing server between the plurality of client devices 206-216, the POS terminal 230, and a destination server, namely, the central processing system 140. For example, the server 202 may be configured to communicate the central processing system 140 and with the client device 206-216 via a multitude of protocols, such as packet-switched protocols, web services, web APIs, etc. The server 202 may also convert (if necessary) and route client application data (not shown) to the appropriate server, such as the central processing system 140 for example. Additionally, the server 202 may act as the destination server and need not route any data from the client devices 206-216.

As shown in FIG. 1C, the program memory 226 and/or the RAM 230 may store various applications for execution by the microprocessor 228. For example, a user-interface application 236 may provide a user interface to the server 202, which may, for example, allow a network administrator to configure, troubleshoot, or test various aspects of the server's operation, or otherwise to access information thereon. A server application 238 operates to populate and transmit client application data and web pages to the client devices 206-216, receive information from the user transmitted back to the server 202, and forward appropriate data to the central processing system 140 and the facility servers 126, as described below. Like the software 171 of FIGS. 1A and 1B, the server application 238 may be a single module 238 or a plurality of modules 238A, 238B. While the server application 238 is depicted in FIG. 1C as including two modules, 238A and 238B, the server application 238 may include any number of modules accomplishing tasks related to implementation of the server 202. By way of example, the module 238A may populate and transmit the client application data and/or may receive and evaluate inputs from the user to receive a mobile coupon request, while the module 238B may communicate with one or more of the back end components 104 to fulfill a data access request.

Figure 1D:
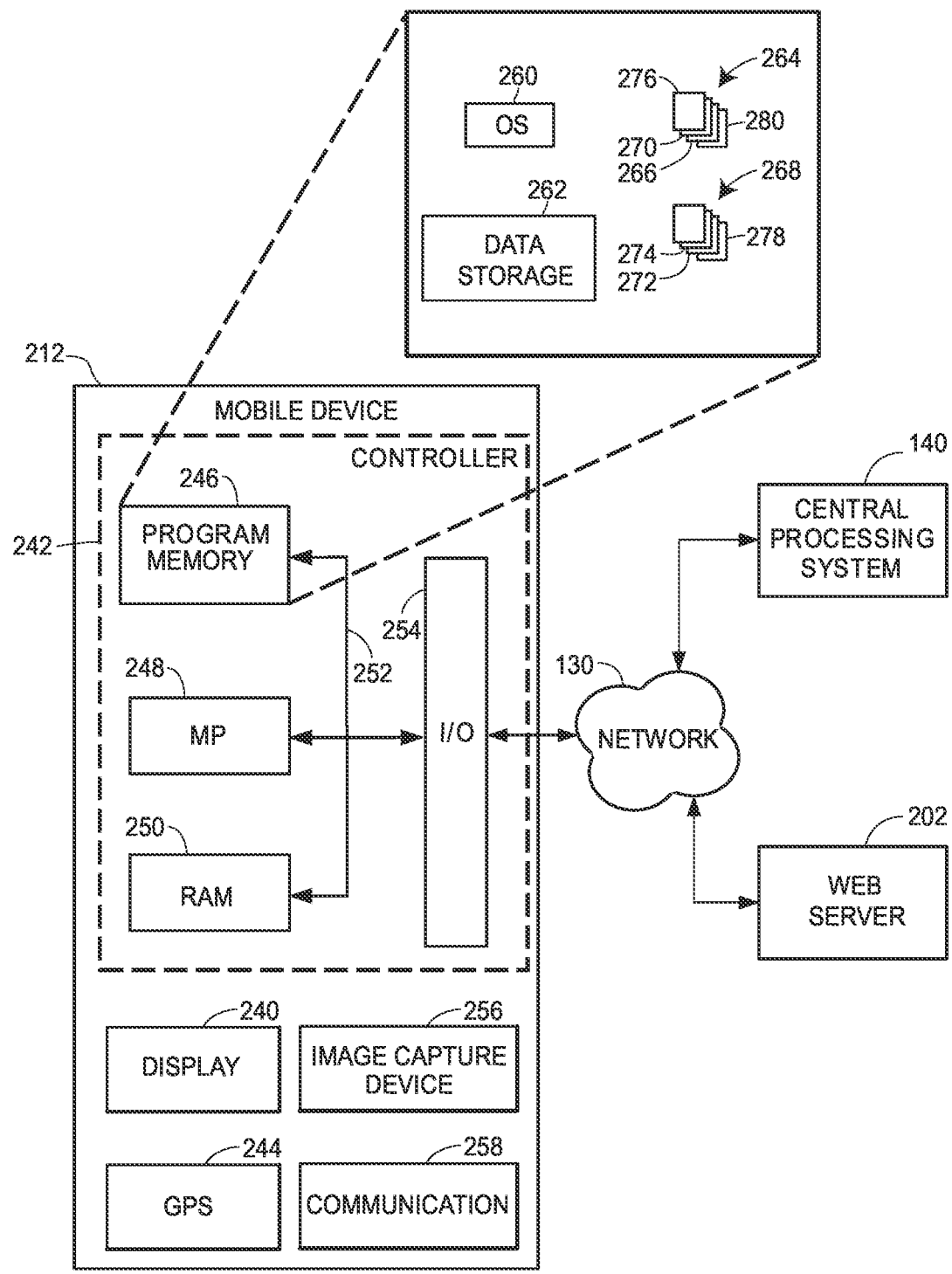
FIG. 1D illustrates a block diagram of an exemplary mobile device.

Referring now to FIG. 1D, the mobile device 212 (or any of the client devices 206-216) includes a display 240, a Global Positioning System (GPS) unit 244, a communication unit 258, an image capture device 256, a user-input device (not shown), and, like the server 202, a controller 242. Similar to the controllers 155 and 224, the controller 242 includes a program memory 246, one or more microcontroller or a microprocessor (MP) 248, a random-access memory (RAM) 250, and an input/output (I/O) circuit 254, all of which are interconnected via an address/data bus 252.

The program memory 246 includes an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as user profiles and preferences, application data for the plurality of applications 264, routine data for the plurality of routines 268, and other data necessary to interact with the server 202, the facility servers 126, or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that reside within the mobile device 212.

The GPS unit 244 may use "Assisted GPS" (A-GPS), satellite GPS, or any other suitable global positioning protocol (e.g., the GLONASS system operated by the Russian government) or system that locates the position the mobile device 212. For example, A-GPS utilizes terrestrial cell phone towers or Wi-Fi hotspots (e.g., wireless router points) to more accurately and more quickly determine location of the mobile device 212 while satellite GPS generally are more useful in more remote regions that lack cell towers or Wi-Fi hotspots. The communication unit 258 may communicate with the server 202 via any suitable wireless communication protocol network, such as a wireless telephony network (e.g., GSM, CDMA, LTE, etc.), a Wi-Fi network (802.11 standards), a WiMAX network, a Bluetooth network, etc. The image capture device 256 may be a built-in camera within the mobile device 212 or may be an external camera, such as a webcam, that is communicatively coupled with the mobile device 212 (or any other internet-enabled device 206-216). The communication unit 258 may also be capable of communicating with POS terminal 128 or other computer using a near field communication standard (e.g., ISO/IEC 18092, standards provided by the NFC Forum, etc.). Such near field communications may allow the mobile device 212 to authorize the POS terminal 128 to charge an account (e.g., a credit card account, a debit card account, or a bank account) linked with the mobile device 212 or client application 266 for the purchase being made with the POS terminal 128. In some embodiments, near field communications may also be used to communicate the code used to trigger the offered coupon deal as an alternative to scanning a barcode or manually entering a number as discussed below. The user-input device (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. The user-input device (not shown) may also include a microphone capable of receiving user voice input. As discussed with reference to the controllers 155 and 224, it should be appreciated that although FIG. 1D depicts only one microprocessor 248, the controller 242 may include multiple microprocessors 248. Similarly, the memory of the controller 242 may include multiple RAMs 250 and multiple program memories 246. Although the FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 212. One of the plurality of applications 264 may be a native web browser 270, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server 202, the facility servers 126, or the server applications 113 while also receiving inputs from the user. Another application of the plurality of applications may include an embedded web browser 276 that may be implemented as a series of machine-readable instructions for receiving, interpreting, and displaying web page information from the servers 202, 126, or server applications 113 within the client application 266. One of the plurality of routines may include an image capture routine 272 that coordinates with the image capture device 256 to retrieve image data for use with one or more of the plurality of applications, such as the client application 266, or for use with other routines. Another routine in the plurality of routines may include a barcode scanning routine 274 that determines a barcode type from the image data and decodes the barcode into decoded data according to the barcode type. Likewise, the barcode scanning routine 274 coordinates with the image capture routine to obtain image data and process the image data into a barcode type and decoded data for use with the client application 266.

Preferably, a customer or a user may launch the client application 266 from a client device, such as one of the client devices 206-216, to access the server 202 cooperating with the central processing system 140 and the stores 112 to implement the omni-channel coupon system 100. Additionally, the customer or the user may also launch or instantiate any other suitable user interface application (e.g., the native web browser 270, or any other one of the plurality of software applications 264) to access the server 202, the facility servers 126, or the server applications 113 to realize the omni-channel coupon system 100. As used herein, the term "customer" indicates someone purchasing an online or in-store retail product, interested in purchasing an online or in-store retail product, browsing the store 112, etc. Moreover, the term "customer" is not limited to a single person, but may instead be any person or persons having a reason or desire to purchase one or more retail products. Generally, the term "user" is used when referring to a person who is operating one of the client devices 206-216 and is not exclusive of the terms "customer."

As described above, one or both of the databases 146 and 139, illustrated in FIGS. 1A and 1C, respectively, include various information about the store's customers and the products sold at the store, as well as basic biographical information about the customer, such as a customer name, a customer address, a customer phone number, and the like. Customer records or user profiles are among the exemplary data that the omni-channel coupon system 100 may store on the databases 146 and 139. Customer records or user profiles may include the basic biographical information discussed above, but may also include information such as a username, email address, customer credit card number, loyalty program account number, record of customer purchases, most purchased items, coupons used, coupons selected for future user, etc. Of course, the customer record need not include all of the information above, such as when the omni-channel coupon system 100 determines some information but does not store it, or stores it someplace other than with the customer record in the database 146 or the database 139. Moreover, the customer record may include additional information not mentioned above.

As shown in FIG. 1B, to access the server 202, the facility servers 126, or the server applications 113, the user executes the client application 266 on one of the client devices 206-216, such as the mobile device 212. Using the client application 266, the user may request server data (not shown) by navigating a series of client application screens, such as the home screen 222 of the client application 266. FIGS. 2A-2D and 4 depict client application pages or screens that the server 202, the facility servers 126, or the server applications 113 may transmit in various embodiments of the omni-channel coupon system 100. Additionally, using the web browser 270, the user may request server data (not shown) by navigating a series of web pages. FIGS. 3A-3C depict web pages that the server 202, the facility servers 126, or the server applications 113 may transmit in various embodiments of the omni-channel coupon system 100. In any event, the user may launch the client application 266 from one of the client devices 206-216 via any suitable manner, such as touch-selecting a client application icon (not shown) on the display 240 of the mobile device 212 or speaking a voice command into the microphone (not shown) of the tablet computer 206. After the user launches the client application 266, the home screen 222 of the client application 266 is displayed to the user on the mobile device 212.

Figure 2A:
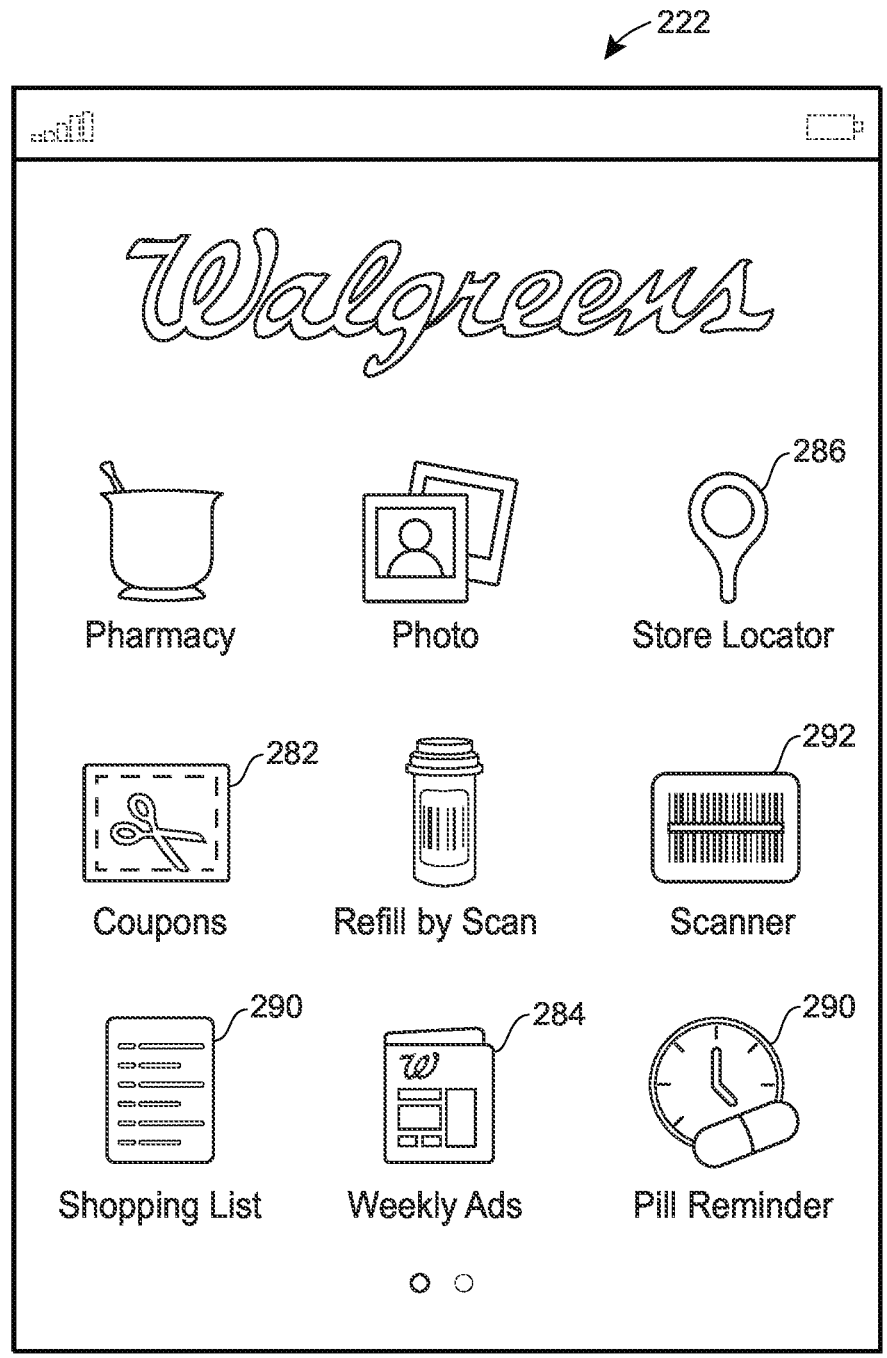
FIG. 2A depicts a home screen of a client application.
Figure 3A:
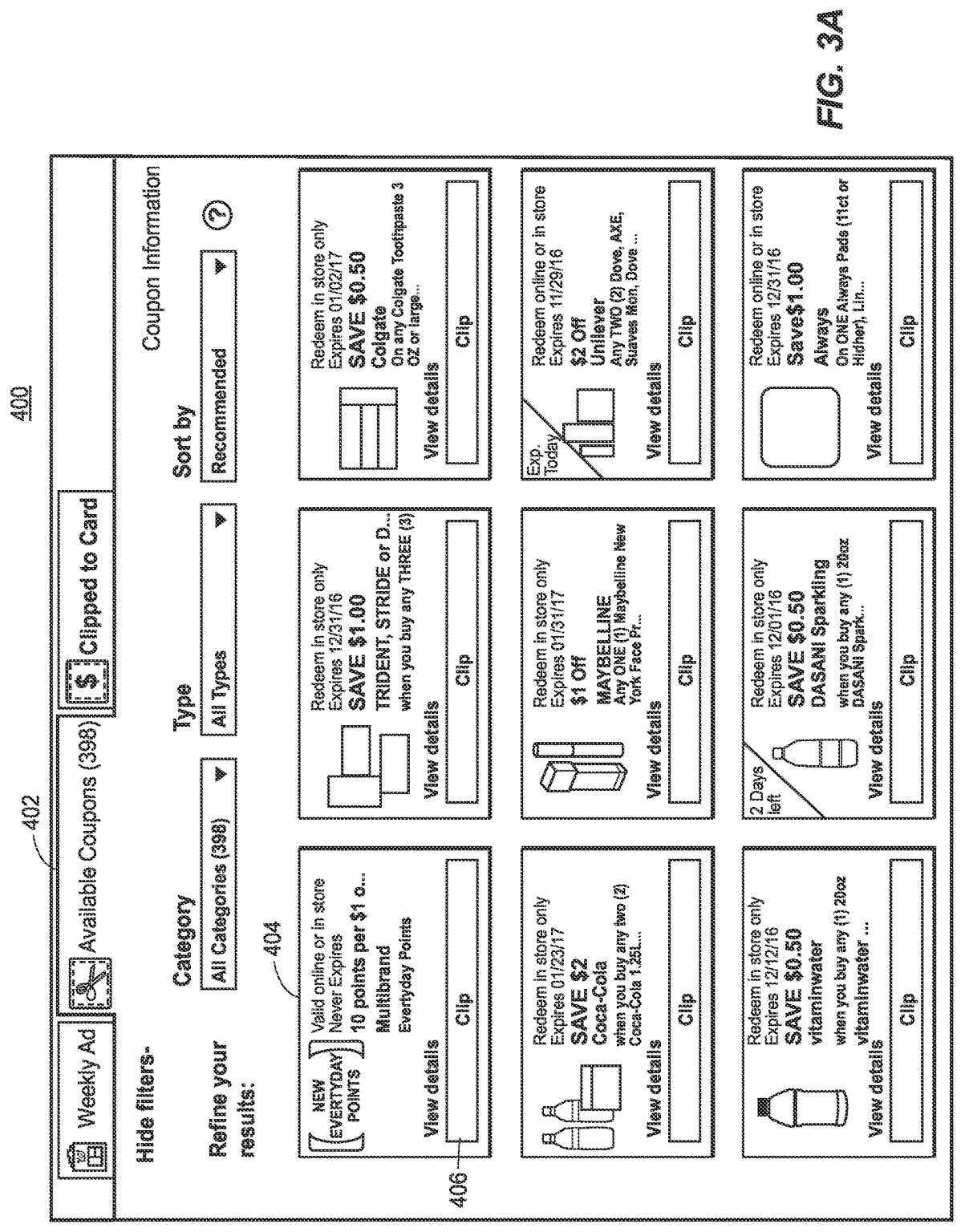
Figure 3B:
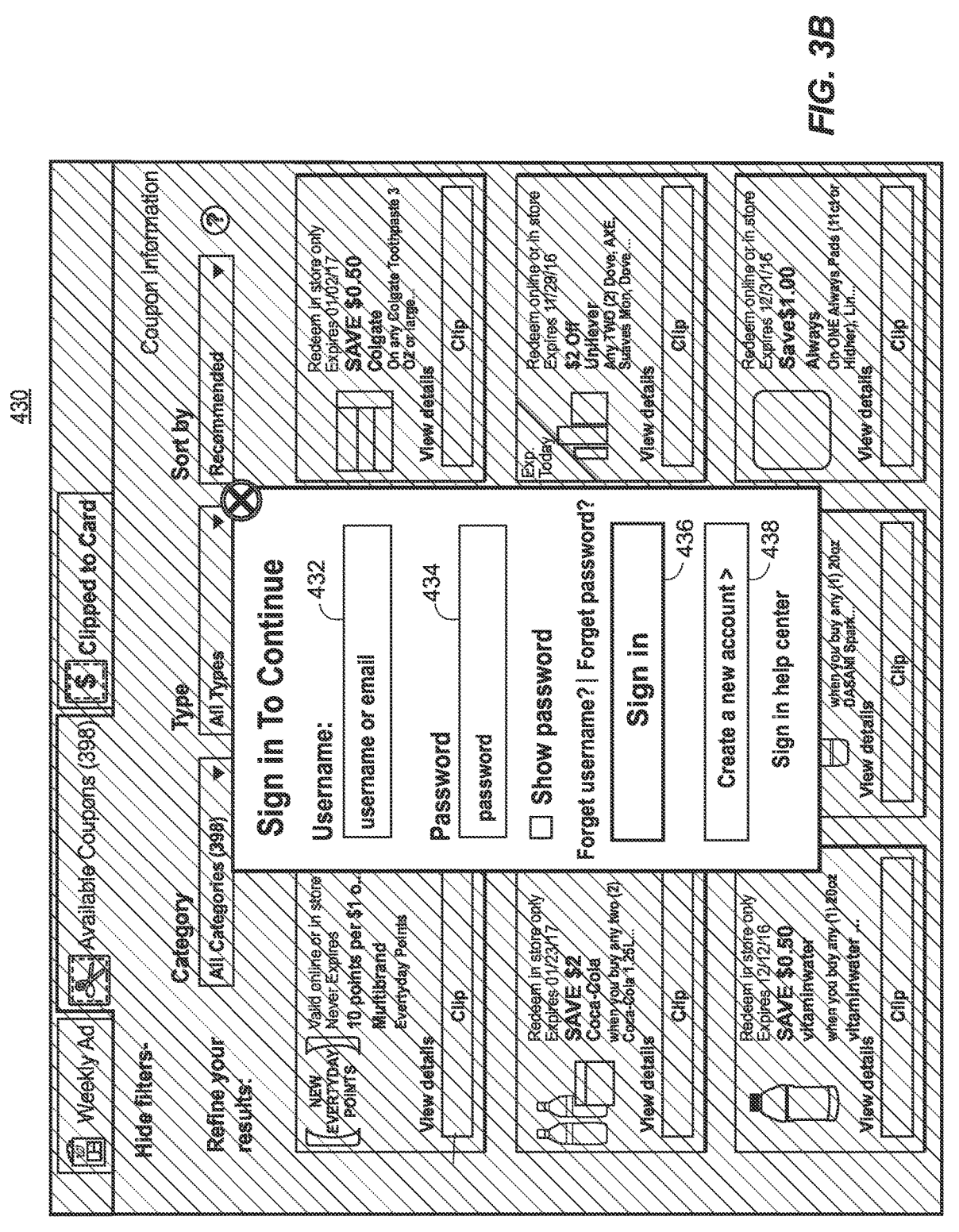
Figure 3C:
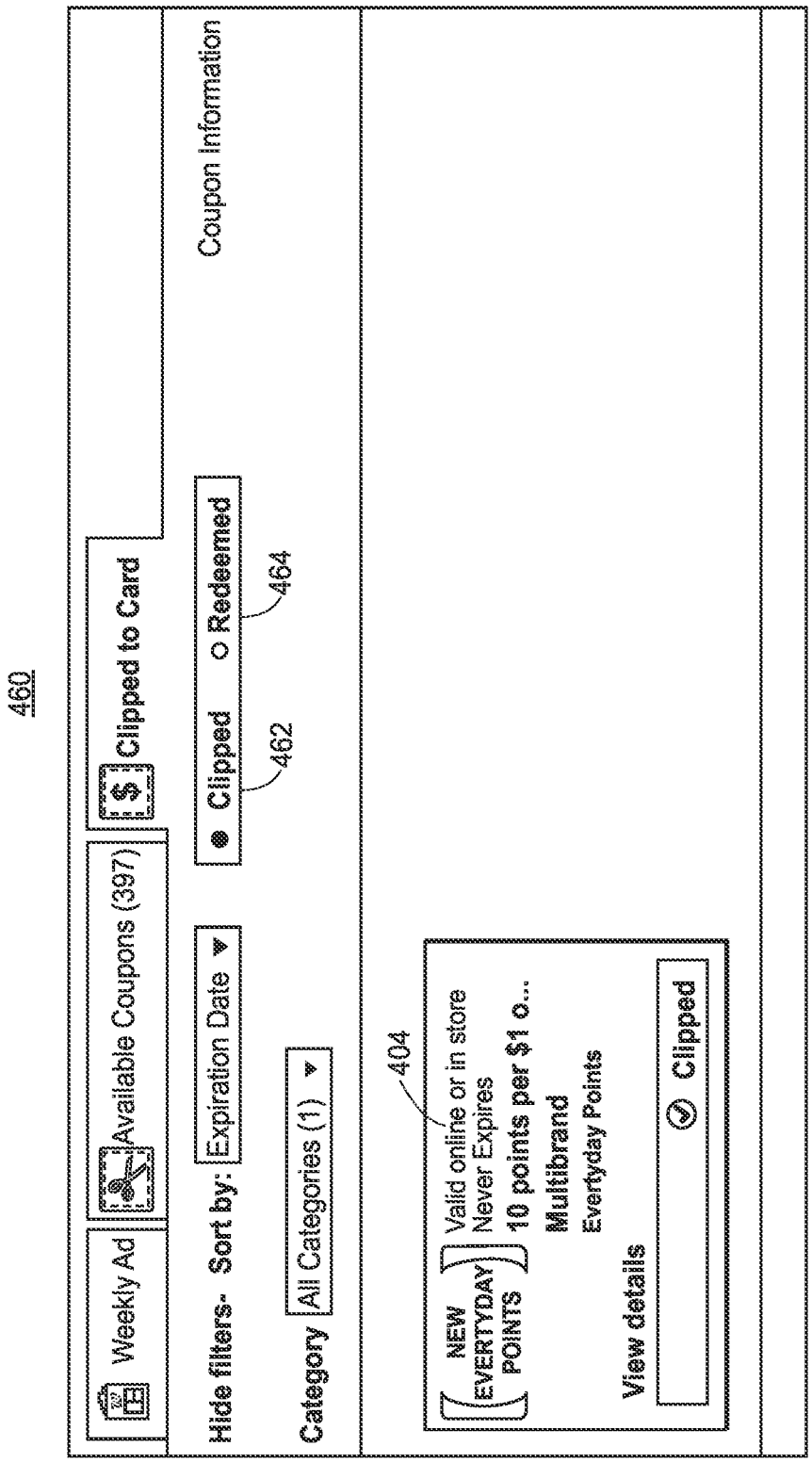
FIG. 3C depicts an embodiment of a user stored coupon page associated with a website in accordance with the presently described embodiments.

With reference now to FIG. 2A, the home screen 222 of the client application 266, for example, is displayed to the user on the mobile device 212. The home screen 222 may include a "Coupons" icon 282, a "Weekly Ads" icon 284, a "Store Locator" icon 286, a "Shopping List" icon 290, and a "Scanner" icon 292. In another embodiment, using the client application 266, the user may request and navigate a series of web pages transmitted, preferably in a secure manner (e.g., using Hypertext Transfer Protocol Secure, known as "HTTPS"), by the server 202 to the client device 206-216. These web pages may be interpreted and displayed via the native browser 270 of the client device 206-216 or another browser application. The client application 266 may also perform the same functions as the native browser 270 by making application programming interface (API) calls to the server 202 to display and clip coupons. It should be understood that it may be desirable for some or all of the data transmitted from the server 202 to the client device 206-216, or vice versa, to be encrypted and/or otherwise transmitted in a secure manner. Example web pages are depicted in FIGS. 3A-3C, as described in more detail below.

Figure 2B:
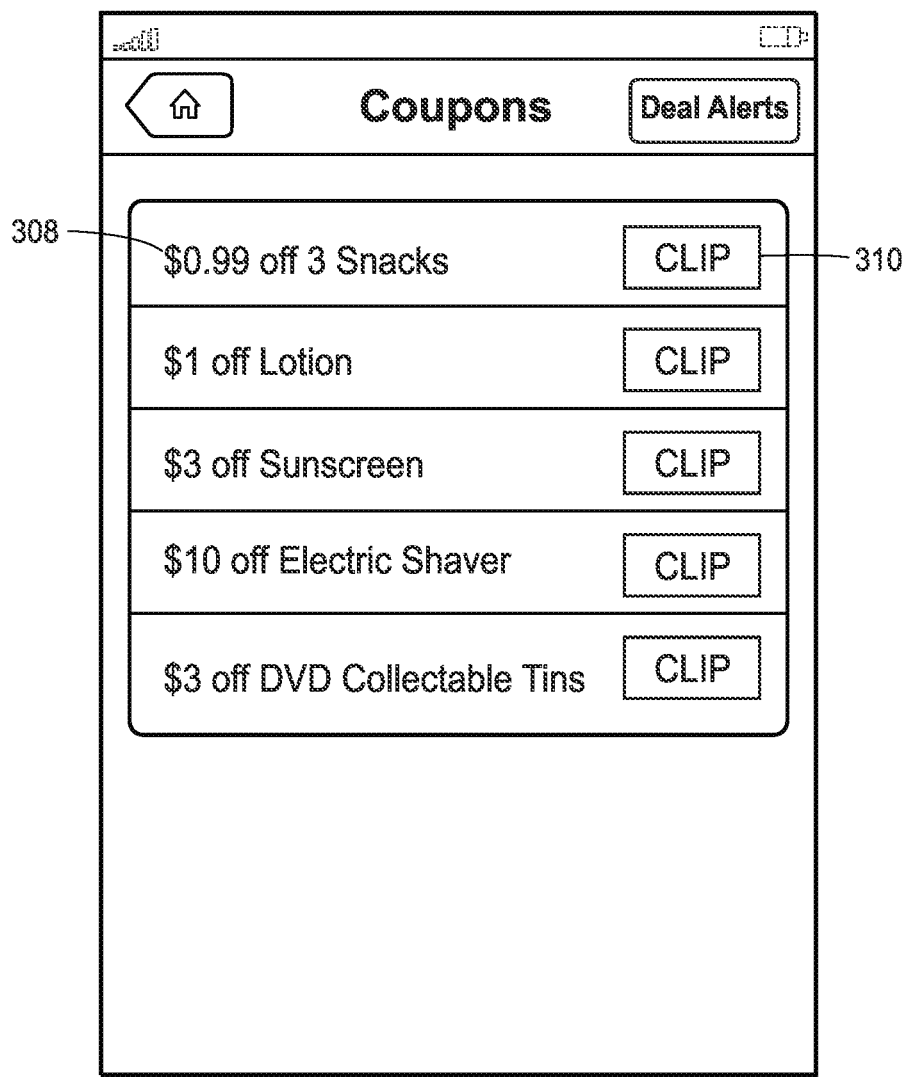
FIG. 2B depicts an embodiment of a coupon retrieval screen associated with a client application in accordance with the presently described embodiments.

From the home screen 222, the user may select the "Coupons" icon 282 to navigate directly to a coupon retrieval screen 300, as shown in FIG. 2B, that may be displayed on the mobile device 212 via the client application 266. The coupon retrieval screen 300 may include one or several individual coupon links 308 to electronic coupons. The individual coupon links 308 may be activated by a user command (e.g., touch command, voice command, etc.). Additionally, the individual coupon links 308 may include a "Clip" button 310 which allows the user to select the coupon by a user command (e.g., touch command, voice command, etc.) from the mobile application couponing channel. When a coupon is selected, the user may be prompted by the client application 266 to log in to a user profile by providing user identification information (e.g., a loyalty account number, a user ID, a username, a password, a PIN, a passcode, an email address, a phone number, etc.) or the user may already be logged in to the user profile.

In some embodiments, a user may provide user identification information to a client device 206-216 once and the client device 206-216 may locally store the user identification information, so that the user does not need to provide the user identification information when using the client application 266 in the future. For example, when the user navigates a series of web pages using the web browser 270, a browser cookie may be stored at the client device 206-216 which includes the user identification information for subsequent automatic log ins. The user may then be automatically logged in for all subsequent uses of the particular client device 206-216 (e.g., for subsequent coupon clipping and/or redemption).

The server 202 may then store the selected coupon in the user profile for the user, so that the selected coupon may be redeemed during a purchase. In some embodiments, the client application 266 may display or a web browser may display the selected coupons stored in the user profile, as described in more detail below.

Figure 2C:
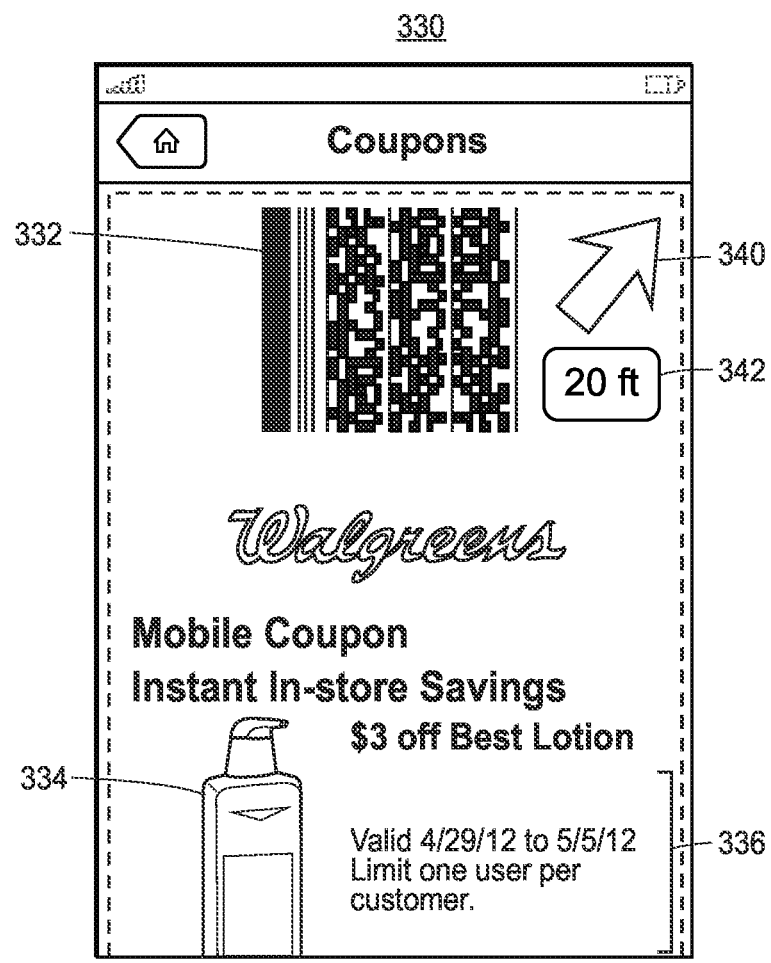
FIG. 2C depicts an embodiment of a coupon display screen associated with a client application in accordance with the presently described embodiments.

In any event, in response to the activation of an individual coupon link 308, a coupon display screen 330, as shown in FIG. 2C, may be displayed on the mobile device 212 via the client application 266. The coupon display screen 330 is used to display a code that when entered at the POS terminal 128 triggers the offered coupon deal (for example, $3 off the purchase of lotion as depicted in FIG. 2C). With reference to FIG. 2C, the code may be represented as a two-dimensional barcode 332 that is a coded representation of information that when scanned by the POS terminal 128 and/or transmitted to the server 202 and interpreted by the omni-coupon system 100 causes the coupon deal to be applied to the customer's purchase. Similarly, a one-dimensional barcode (not shown), or any other symbology could be used as an alternative or in addition to the two-dimensional barcode 332. The coded representation of information for the coupon may include a coupon identifier which uniquely identifies the coupon, a product identifier which uniquely identifies the product or item to which the coupon applies (e.g., a Universal Product Code (UPC) number), a coupon expiration date, a textual description of the terms of the coupon deal being offered, a link to a coupon image, or any other suitable information.

In some embodiments, when the user selects the coupon via the "Clip" button 310 as shown in FIG. 2B, the information for the coupon may be transmitted to the server 202 and stored with the user profile for the user. Then when the user purchases the product or item to which the coupon applies at a retail store, the server 202 may transmit the coded representation of information for the coupon to the mobile device 212 or the POS terminal 128. Accordingly, the user may select which coupons stored in the user profile she wants to redeem. The POS terminal 128 may then scan coded representations for the selected coupons and apply the coupon deals or offers to the user's purchase. In some embodiments, the user may swipe, insert, or scan an identification card 232 at the POS terminal 128 such as a loyalty card having a magnetic stripe, electronic circuit (e.g., an electronic chip) or RFID tag. The POS terminal 128 may then obtain user identification information from the identification card 232 and transmit the user identification information to the server 202. In turn, the server 202 may retrieve a user profile corresponding to the user identification information along with the coupons stored in the user profile. The server 202 may then transmit coupon information for the coupons to the POS terminal 128 to apply the coupon deals to the user's purchase.

In another exemplary scenario, when the user purchases the product or item to which the coupon applies at a retail store, the POS terminal 128 may obtain product identifiers for each of the products or items purchased by the user. The POS terminal 128 may also receive coupon information for each of the coupons in the user profile from the server 202. Then the POS terminal 128 may compare the product identifiers for each of the products or items to product identifiers included in the coupon information for coupons stored with the user profile for the user. When there is a match, the POS terminal 128 and/or the server 202 may automatically apply the coupon deal or offer for the matching coupon to the user's purchase. In another exemplary scenario, when the user purchases the product or item via an online store, the server 202 or the client device 206-216 may obtain product identifiers for each of the products or items purchased by the user. The server 202 or the client device 206-216 may then compare the product identifiers for each of the products or items to product identifiers included in the coupon information for coupons stored with the user profile. When there is a match, the server 202 or the client device 206-216 may automatically apply the coupon deal for the matching coupon to the user's purchase.

In any event, the coupon display screen 330 may also include a picture 334 of the item, product, good, or service to which the coupon applies and a textual description 336 of the terms of the coupon deal being offered (e.g., the offered discount, how to redeem the coupon, limitations on the coupon deal, etc.).

The coupon display screen 330 may further include a heading arrow 340 and a distance 342, for example when the GPS unit 244 of the mobile device 212 determines that the user is shopping in a retail store rather than online. In such embodiments, the client application 266 may receive a physical location of the product or item (e.g., a precise latitude and longitude of the shelf in the store 112 on which the product or item can be located, etc.) to which the coupon applies. Accessing the GPS unit 244 of the mobile device 212, the client application 266 may determine a product location vector (not shown) comprising a vector heading and a vector distance. The heading is the direction at which the mobile device 212 (and the user holding the mobile device 212) must proceed to reach the shelf at which the physical location of the product to which the coupon applies. This vector heading may be represented as a heading arrow 340 on the coupon display screen 330. The vector distance is the physical distance separating the mobile device 212 from the product location. The vector distance may be represented as a distance 342 on the coupon display screen 330.

While the client application 266 is causing the mobile device 212 to display the coupon display screen 330, the operating system 260 or the client application 266 may also be executing a program or routine to enable the customer to use the mobile device 212 as a method of payment. Additionally or alternatively, the operating system 260 or the client application 266 may provide the capability to use the mobile device 212 as a method of payment at other times. In such embodiments, the mobile device 212 may utilize a near field communication standard (e.g., ISO/IEC 18092, standard provided by the NFC Forum, etc.) to allow the mobile device 212 to engage in short range wireless communication with the POS terminal 128. Such near field communications may allow the mobile device 212 to authorize the POS terminal 128 to charge an account (e.g., a credit card account, a debit card account, or a bank account) linked with the mobile device 212 or client application 266 for the purchase being made with the POS terminal 128.

In other embodiments, when the user purchases a product or item online, the mobile device 212 may communicate with the server 202 to authorize the server 202 to charge an account (e.g., a credit card account, a debit card account, or a bank account) for the purchase. The user may manually enter account information to the mobile device 212 or any other suitable client device 206-216 and the client device 206-212 may transmit the account information to the server 202 to complete the purchase.

In some embodiments, near field communications may also be used to communicate user identification information to the POS terminal 128 (e.g., a loyalty account number, a user ID, a username, a password, a PIN, a passcode, an email address, a phone number, etc.) via mobile applications such as Apple® Wallet and Android Pay™, for example. More specifically, a payment account such as Apple® Wallet or Android Pay™ may be linked to a user's loyalty account or user profile, such that redemption occurs automatically when payment is tendered for the corresponding products or items. In this manner, when a user purchases products or items at a retail store 112, near field communications may allow the mobile device 212 to authorize the POS terminal 128 to charge an account (e.g., a credit card account, a debit card account, or a bank account) linked with the mobile device 212 or client application 266 for the purchase being made with the POS terminal 128. A loyalty account or user profile linked to the account may also be obtained at the POS terminal 128 and the POS terminal 128 may obtain and apply coupons stored with the user profile to the purchase.

In other embodiments, the mobile device 212 may generate and display a bar code or other coded representation of user identification information (e.g., a loyalty account number, a user ID, a username, a password, a PIN, a passcode, an email address, a phone number, etc.). The POS terminal 128 may then scan the bar code to obtain the user identification information for retrieving coupons stored with the user profile of the user.

Figure 2D:
FIG. 2D depicts an embodiment of a weekly ad image view screen associated with a client application in accordance with the presently described embodiments.

In another exemplary scenario, the user may select the "Weekly Ads" icon 284 from the home screen 222 to navigate directly to a weekly ad image view screen 360, as shown in FIG. 2D. The weekly ad image view screen 360 may display a page of a virtual version 372 of a weekly advertisement (not shown) of the kind that was traditionally printed and inserted into the Sunday edition of the local newspaper (not shown). The weekly ad image view screen 360 may include a "Previous" button 366 and "Next" button 368 that the user can activate to page through the various pages of the virtual ad 372. In some embodiments, the virtual ad 372 displayed on the weekly ad image view screen 360 may have regions 370 associated with areas of the printed weekly ad that contain coupons that could be clipped from the print version of the weekly ad. The user may select the region 370 by using a touch or voice input to cause the coupon to be presented using the coupon display screen 330 as described above. Accordingly, the user may clip the coupon from the virtual ad 372 and the server 202 may then store the selected coupon in the user profile for the user. Then the coupon may be redeemed at the POS terminal 128. Additionally or alternatively, the region 370 may have codes (e.g., a one or two dimensional barcode) that can be directly scanned by the POS terminal 128.

Figure 2E:
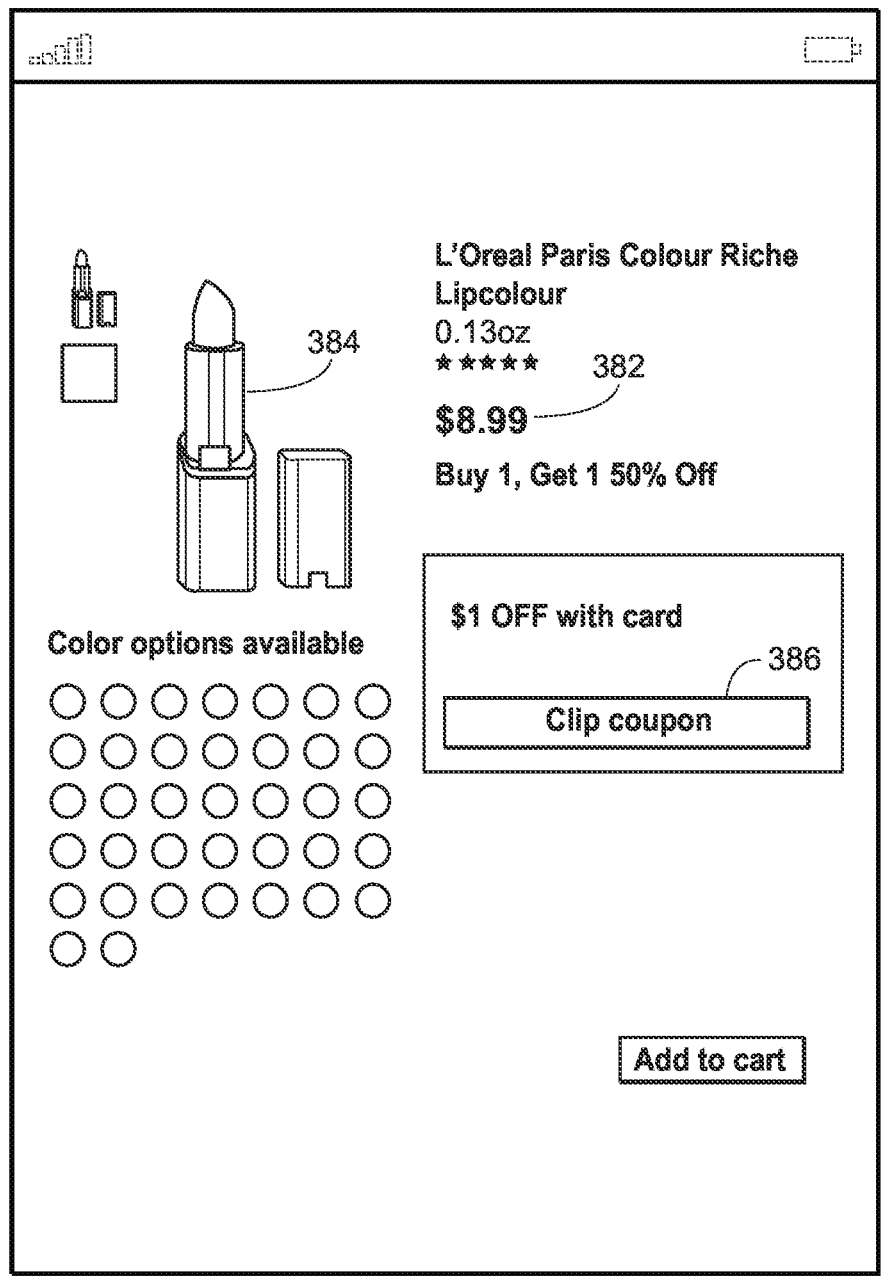
FIG. 2E depicts an embodiment of a product detail screen associated with a client application in accordance with the presently described embodiments.

In addition to retrieving coupons from the coupon retrieval screen 300 and the weekly ad image view screen 360, coupons may be retrieved from a shopping list screen (not shown), a search results screen (not shown), when searching for products, items, or coupons, and/or a product detail screen 380 as shown in FIG. 2E providing details of a product or item such as an image of the product or item, a name of the product or item, etc.

The client application 266 may include a search field which allows the user to search for a specific item (e.g., Coca-Cola®) or a general type of item (e.g., bread). Then a search results screen may be displayed which includes information about whether the searched for product is available online or at one or more stores 112, what the price of the product is, a photograph of the product, etc. If one or more coupons is available, the search results screen may include a "Coupon" button that when activated may cause the mobile device 212 to display one or more virtual coupons. The coupons may be displayed in a manner previously discussed such as in the coupon display screen 330.

The user may select one of the products displayed on the search results screen to view a product detail screen for the selected product, such as the product detail screen 380 as shown in FIG. 2E. The product detail screen 380 may include information about whether the selected product is available online or at one or more stores 112, what the price of the product is 382, a photograph of the product 384, etc. If one or more coupons is available, the product detail screen 380 may include the coupon along with a "Clip coupon" button 386 which allows the user to select the coupon by a user command (e.g., touch command, voice command, etc.) from the mobile application couponing channel. In some embodiments, the user may select the coupon to display a more detailed view. For example, the coupon may be displayed in a manner previously discussed such as in the coupon display screen 330.

Figure 2F:
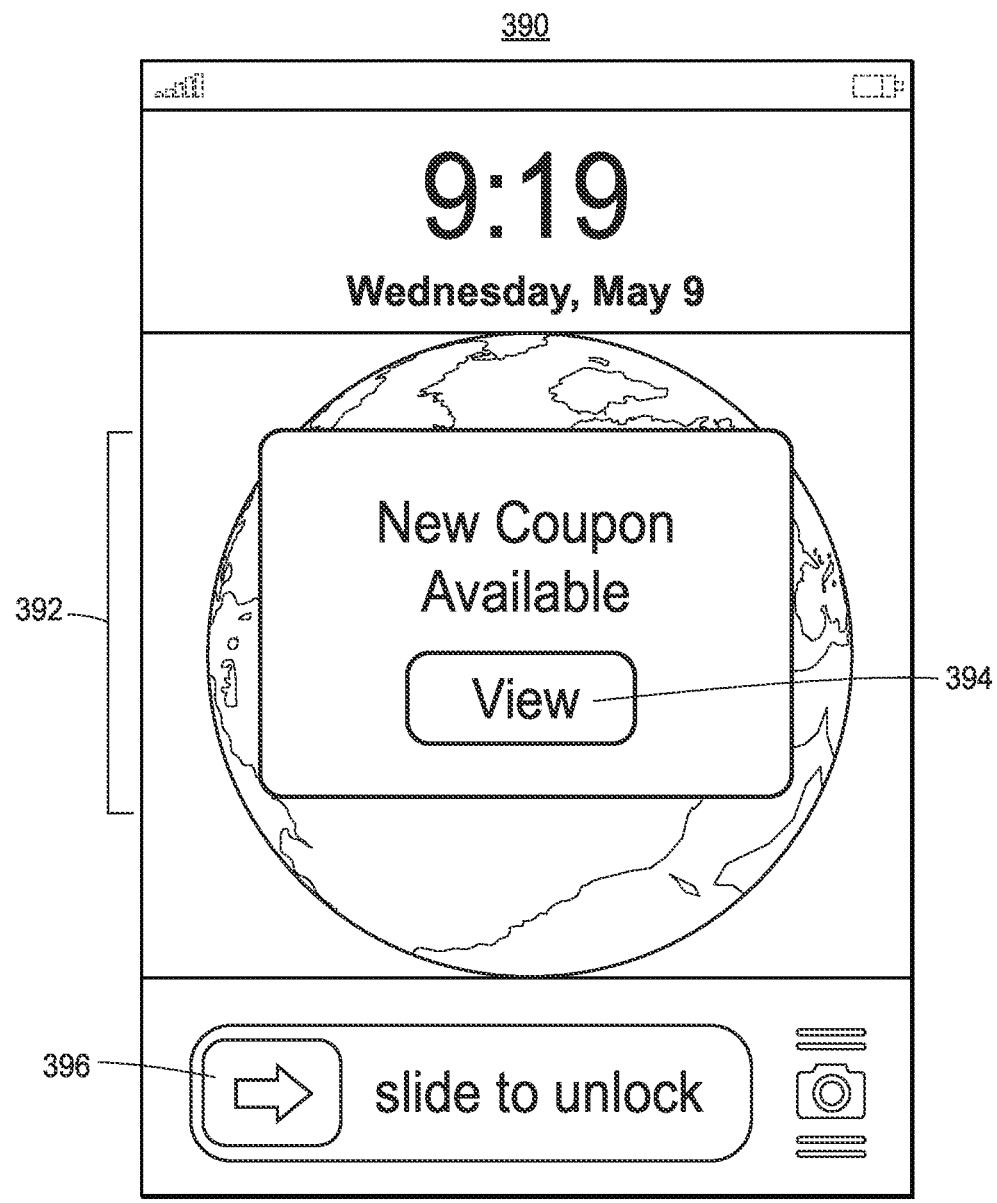
FIG. 2F depicts an embodiments of a mobile device lock screen associated with a client application in accordance with the presently described embodiments.

In some embodiments, the server 202 may provide coupons to the mobile device 212 via a mobile device lock screen 390, as shown in FIG. 2F. The operating system 260 of the mobile device 212 may display the mobile device lock screen 390 on the display 240, for example, in response to a user command or after a certain amount of time since the user's last command. A mobile device lock screen 390 can be used to prevent unintentional usage of the mobile device 212 such as when the mobile device 212 is being stored in a user's purse (not shown) or carried in a pocket (not shown). A mobile device lock screen 390 can also be used to display various alerts to inform the user of something. Accordingly, the client application 266 may execute to cause a coupon alert notification 392 to be displayed on the screen 240 of the mobile device 212. The mobile device lock screen 390 may also include a "View" button 394 which when activated causes the client application 266 to navigate to the coupon display screen 330. Additionally, the mobile device lock screen 390 may also include an unlock control 396 which may be activated to navigate to a display of all of the coupons that are available for redemption or to the coupon display screen 330.

In some embodiments, the server 202 may provide a coupon alert notification 392 to the mobile device 212 or any other client device 206-216 when a new coupon is available for redemption by the user. The coupon alert notification 392 may be received as a push notification if the user selects an option to allow push notifications. Then the client application 266 may cause the display 240 of the mobile device 212 to display the coupon alert notification 392 on the mobile device lock screen 390. Alternatively, the coupon alert notification 392 may appear while the display 240 is displaying any other screen, whether the screen was generated by the client application 266 or not (the coupon alert notification 392 may appear while the display is displaying a screen generated by one of a plurality of software applications 264). If the user activates a "View" button 394, a coupon corresponding to the coupon alert notification 392 may be displayed on the coupon display screen 330. In some embodiments, the client application 266 may automatically log the user in to the user profile when the user activates the "View" button 394. For example, user identification information which was previously provided by the user may be stored locally on the mobile device 212. The mobile device 212 may then automatically transmit the user identification information to the server 202 to obtain the user profile for the user.

As mentioned above, in the omni-channel coupon system 100, a user may obtain coupons from several couponing channels and redeem each of the coupons via a user profile. In addition to obtaining coupons via a mobile application couponing channel as described above, the user's mobile device 212 or any other client device 206-216 may obtain coupons from the server 202 via a retail web page couponing channel. The server 202 may transmit a series of web pages, preferably in a secure manner to the client device 206-216. These web pages may be interpreted and displayed via the native browser 270 of the client device 206-216 or another browser application.

FIG. 3A depicts an example coupon retrieval page 400 which may be displayed via the native browser 270 of the mobile device 212 or any other suitable client device 206-216. The coupon retrieval page 400 may include an available coupons tab 402 which displays a list of available coupons including the multibrand coupon 404. Each of the available coupons may include a "Clip" button 406 which allows the user to select the coupon by a user command (e.g., touch command, a mouse click, etc.). When a coupon is selected, the user may be prompted by the series of web pages to log in to a user profile by providing user identification information (e.g., a loyalty account number, a user ID, a username, a password, a PIN, a passcode, an email address, a phone number, etc.) or may already be logged in to the user profile. In some embodiments, a user may provide user identification information to a client device 206-216 once and the client device 206-216 may locally store the user identification information, so that the user does not need to provide the user identification information when using the client application 266 in the future. For example, when the user navigates a series of web pages using the web browser 270, a browser cookie may be stored at the client device 206-216 which includes the user identification information for subsequent automatic log ins. The server 202 may then store the selected coupon in the user profile for the user, so that the selected coupon may be redeemed during a purchase. In some embodiments, the web browser may display the selected coupons stored in the user profile, as described in more detail below.

The user may be prompted to log in to a user profile via a user log in page 430, as shown in FIG. 3B. The user log in page 430 may include user controls for entering a username 432 and password 434, and submitting the username and password to the server 202 via a "Sign In" button 436. Additionally, the user log in page 430 may include a user control for creating a user profile or loyalty account 438. When the server 202 receives the username and password and/or any other suitable user identification information, the server 202 may compare the user identification information to stored user identification information corresponding to several user profiles. When the user identification information matches with a set of the stored user identification information corresponding to a particular user profile, the server 202 may store the selected coupon, such as the multibrand coupon 404 with the user profile.

In some embodiments, the server 202 may then transmit a user stored coupon page 460 as shown in FIG. 3C to the mobile device 212 or any other suitable client device 206-216. The user stored coupon page 460 may include a list of the coupons that are stored with the user profile for the user. For example, the multibrand coupon 404 is displayed in the user stored coupon page 460. While the user stored coupon page 460 includes one coupon stored with the user profile for the user, any suitable number of coupons may be displayed on the user stored coupon page 460. Also, as mentioned above, the coupon displayed on the user stored coupon page 460 may be obtained from several couponing channels (e.g., a mobile application, a retail web page, a social networking page, a physical coupon, an email, a short message service (SMS) message, a manufacturer/third-party web page or other affiliated web page, a manufacturer/third-party application, etc.). Additionally, the user stored coupon page 460 may include an indication of whether each coupon is clipped 462 or redeemed 464. As a result, the clipped coupons may automatically be redeemed when purchasing products or items at online or retail stores. In some embodiments, the user stored coupon page 460 may include a user control to unclip a coupon or remove the coupon from the user profile. Once the coupon is removed, the coupon deal for the coupon will not be applied to the user's subsequent purchases.

Figure 4:
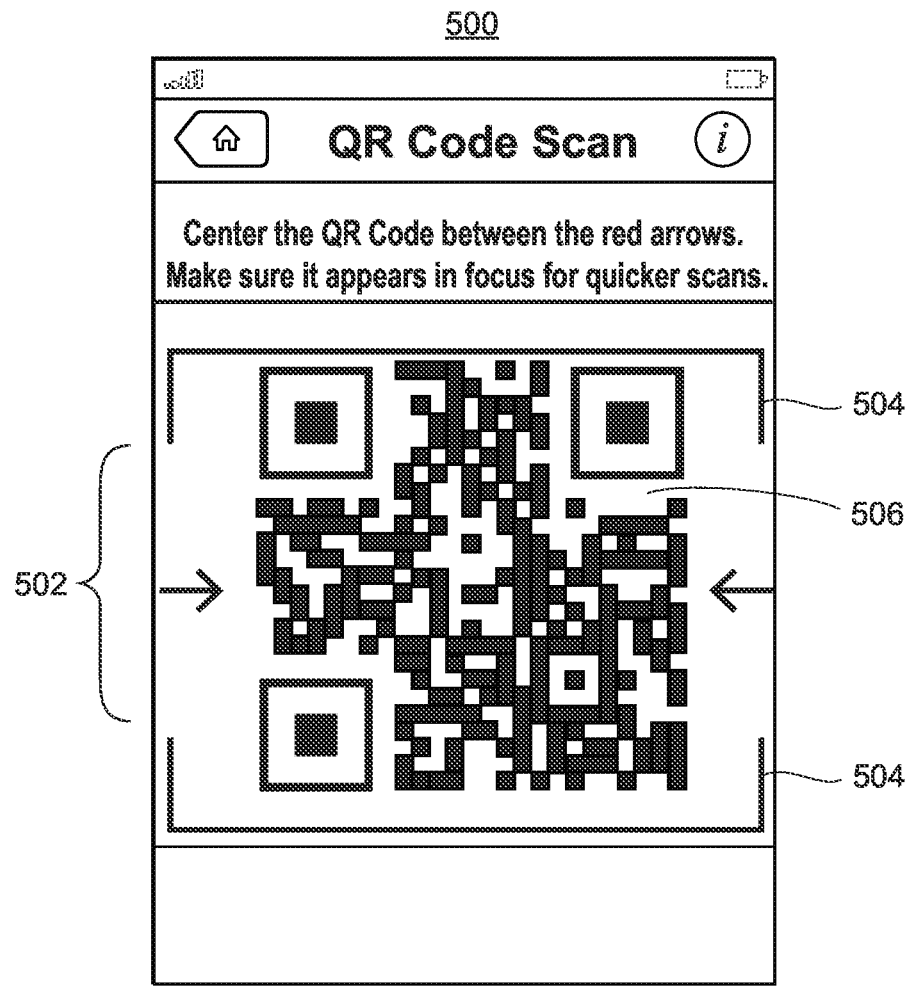
FIG. 4 depicts an embodiment of an image capture screen associated with a client application in accordance with the presently described embodiments.

Another exemplary couponing channel may include a physical coupon (e.g., a paper coupon), for example located in a retail store, in a magazine or newspaper, etc. A user may transform the physical coupon to an electronic coupon by capturing an image of the physical coupon or a code within the physical coupon via the image capture device 256 of the mobile device 212 or another client device 206-216. The code may be represented as a two-dimensional or one-dimensional barcode that is a coded representation of information for the coupon. The coded representation of information for the coupon may include a coupon identifier which uniquely identifies the coupon, a product identifier which uniquely identifies the product or item to which the coupon applies, a coupon expiration date, a textual description of the terms of the coupon deal being offered, a link to a coupon image, etc. In some embodiments, the mobile device 212 may include a barcode scanning routine 274 as mentioned above which decodes the barcode and transmits the decoded information for the coupon to the server 202. Then the server 202 may store the coupon with the user profile for the user. In other embodiments, the mobile device 212 may transmit the barcode to the server 202 and the server 202 may decode the barcode and store the coupon with the user profile. An image of a physical coupon or a code within the physical coupon may be captured via an image capture screen 500 as shown in FIG. 4.

The image capture screen 500 includes an image capture area 502 and framing marks 504 to frame a one-dimensional or two-dimensional (e.g., quick response (QR)) barcode 506. As shown in FIG. 4, the pair of framing marks 504 is specifically spaced apart and sized to frame the length and width ratios of a standard QR Code barcode 506. Aligning the QR Code barcode 506 in the image capture area 502 that resides between the framing marks 504 may cause the mobile device 212 to capture and/or interpret the QR Code barcode 506 and/or any other one-dimensional or two-dimensional barcode. Alternatively, a button (not shown), when activated by a user, may cause the image capture device 256 in the mobile device 212, to capture the QR Code barcode 506. As mentioned above, when the image capture screen 500 captures the QR Code barcode and/or any other suitable barcode, the barcode may be decoded and the decoded information for the coupon may be transmitted to the server 202 and stored with the user profile. Then the physical coupon may be available for redemption when the user purchases a product corresponding to the physical coupon. Moreover, an indication of the physical coupon (e.g., an image of the physical coupon, the barcode for the physical coupon, etc.) may be displayed when the user obtains a list of the coupons that are stored with the user profile, for example via the user stored coupon page 460 as shown in FIG. 3C.

In addition to the mobile application, retail web page, and physical couponing channels, the omni-channel coupon system 100 allows a user to obtain coupons from social networking web pages, emails, SMS messages, manufacturer/third-party web pages or other affiliated web pages, manufacturer/third-party applications, or any other suitable couponing channels. Coupons from many sources including manufacturers or third parties are aggregated in the omni-channel coupon system 100. The omni-channel coupon system 100 then exposes an API which allows coupons to be retrieved and clipped at each of the channels.

The coupons may then be stored with a user profile for later retrieval and/or redemption. In this manner, a user may clip and then redeem a coupon on different client devices. For example, the user may view a coupon on the client application 266 of her mobile device 212 and clip the coupon by selecting the "Clip" button 310 as shown in FIG. 2B. Then when the user is shopping online using a tablet computer 206 as shown in FIG. 1B, desktop computer, or laptop computer, the user may redeem the coupon by retrieving the coupon from the user stored coupon page 460 as shown in FIG. 3C or in any other suitable manner.

In some embodiments, as mentioned above, the server 202 may automatically apply coupon deals for coupons stored with the user profile that correspond to products being purchased by the user. For example, the server 202 may transmit the coupons to the POS terminal 128 to automatically apply the coupon deals to the user's purchase. In some embodiments, the server 202 may transmit reminders or notifications to the client device 206-212 regarding the coupons stored in the user profile based on a set of rules. For example, when the expiration date for the coupon is within a threshold range of the current date, the server 202 may transmit a reminder to the client device 206-216 alerting the user that the coupon is about to expire and recommending that the user purchase a product which corresponds to the coupon before the expiration date.

In some embodiments, the user may select the set of rules for receiving reminders via the client application 266 for example. More specifically, the user may be able to select the number of days until expiration when the server 202 will transmit a reminder (e.g., within one day of expiration, within three days of expiration, etc.).

Also in some embodiments, the server 202 or the POS terminal 128 may analyze the coupon information to determine whether to automatically apply a coupon deal for a coupon to the user's purchase based on a set of rules. For example, when the expiration date for the coupon is within a threshold range of the current date, the server 202 or the POS terminal 128 may automatically apply the coupon deal for the coupon. The user may be able to select the set of rules for automatically applying coupon deals for coupons via the client application 266 for example. More specifically, the user may be able to select types of products or items for which corresponding coupon deals may automatically be applied. For example, the user may indicate that coupon deals for coupons related to toiletries and groceries should automatically be applied to subsequent purchases, but coupons deals for coupons related to larger items (e.g., appliances) should not automatically be applied.

In some embodiments, when a purchase is made online or at a retail store via a POS terminal 128, the purchase items and applied coupon deals may be displayed on the user's client device 206-216 or the POS terminal 128 in an order confirmation page. When coupon deals are automatically applied to the user's purchase, the order confirmation page may include user controls for removing each applied coupon deal from the purchase. In this manner, the server 202 and/or the POS terminal 128 may automatically apply coupon deals for each coupon in the user's profile which relates to the products being purchased and/or corresponds to the set of rules. Then the user may review the automatically applied coupon deals and may remove any coupons which the user does not wish to redeem during the current purchase (e.g., via a touch command, voice command, etc.). The order confirmation page may include a "Submit" button to submit the user's purchase order with the remaining coupon deals. Coupons for coupon deals which are applied to the purchase may be redeemed and removed from the user's profile and the coupons for coupon deals which are not applied may remain in the user's profile for future redemption.

In another exemplary scenario, when a purchase is made online or at a retail store via a POS terminal 128, the purchase items may be displayed on the user's client device 206-216 or the POS terminal 128 in an order confirmation page. The user may provide user identification information to the server 202 via an identification card 232 or by manually entering and submitting the user identification information. Then the server 202 may transmit a display (e.g., the user stored coupon page 460 as shown in FIG. 3C) for presentation on the client device 206-216 or the POS terminal 128, including each of the coupons stored with the user profile that corresponds to the user identification information. In other embodiments, the display may include a subset of the coupons stored with the user profile, where each of the coupons in the subset correspond to products being purchased by the user. The user may select (e.g., via a touch command, voice command, etc.) each of the coupons that the user would like to redeem with the purchase.

In some embodiments, the server 202 and/or the POS terminal 128 may compare the product identifiers for coupons stored with the user profile to product identifiers included in the purchase items. Further, the server 202 and/or the POS terminal 128 may check the expiration date and/or any other qualifying information to ensure that the coupons are valid and may be redeemed. Then the order confirmation page may be updated with each coupon that is valid and may be redeemed with the purchase. The user may select a "Submit" button to submit the purchase order with the coupons. Offers for coupons which are redeemed may be applied to the purchase and the coupons may be removed from the user's profile. Coupons which are not redeemed may remain in the user's profile for future redemption.

Figure 5:
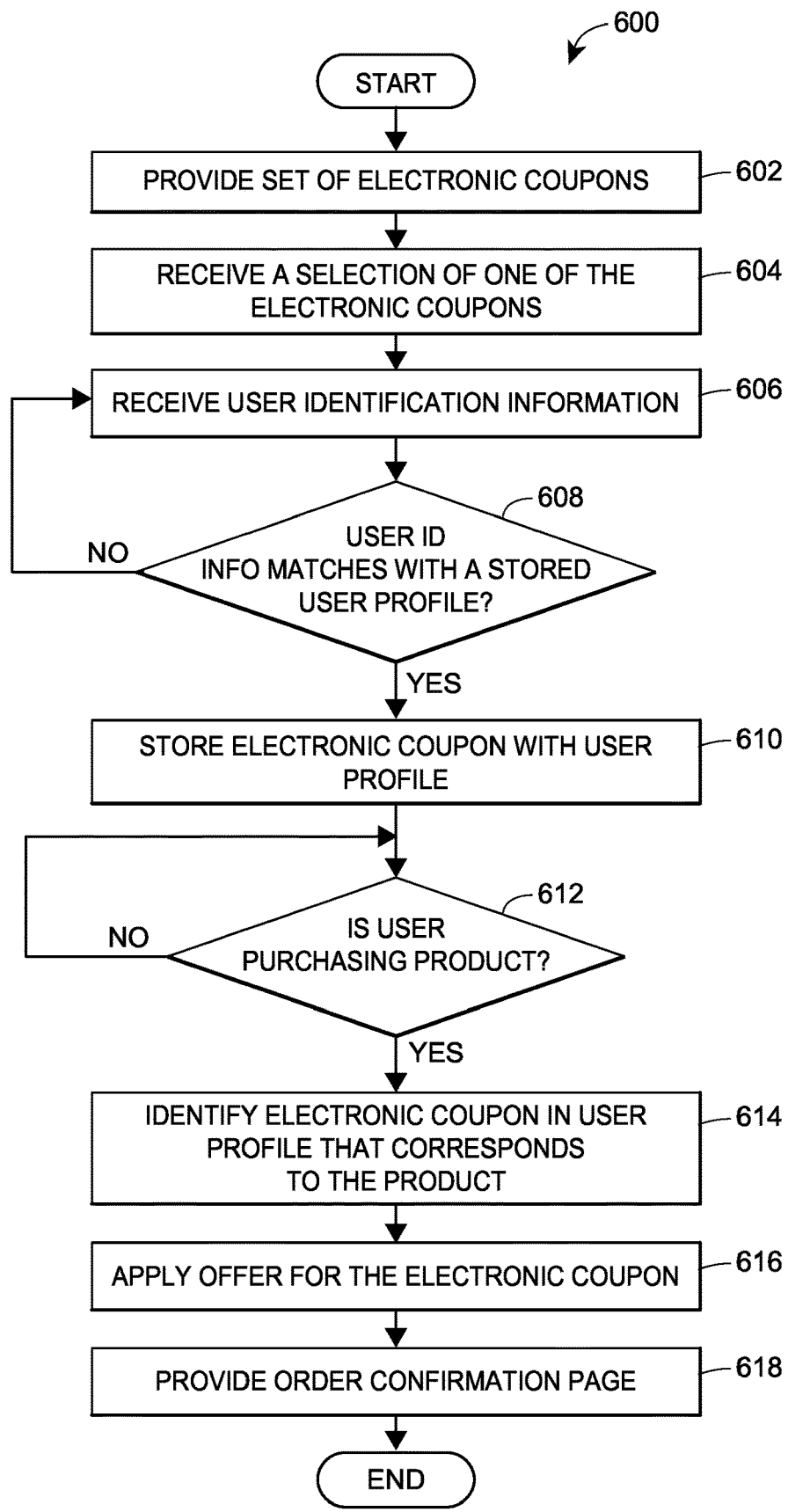
FIG. 5 illustrates a flow diagram representing an exemplary method for linking electronic coupons across a plurality of couponing channels in accordance with the presently described embodiments.

FIG. 5 depicts a flow diagram of an exemplary method 600 for linking electronic coupons across a plurality of couponing channels. The method 600 may be executed on the server 202 and/or the POS terminal 128. In some embodiments, the method 600 may be implemented in a set of instructions stored on a non-transitory computer-readable memory and executable on one or more processors of the server 202. For example, the method 600 may be performed by the software modules 238A and 238B as shown in FIG. 1C. In other embodiments, the method 600 may be implemented by a facility server 126 or a combination of these devices.

At block 602, the server 202 may provide a set of electronic coupons to a client device 206-216 of a user. The electronic coupons may be provided via several couponing channels, such as a mobile application couponing channel, a retail web page couponing channel, a social networking web page couponing channel, an email couponing channel, an SMS couponing channel, a manufacturer/third-party web page or other affiliated web page couponing channel, a manufacturer/third-party application couponing channel, etc. For example, the electronic coupons may be provided via a coupon retrieval screen 300 of the client application 266, as shown in FIG. 2B. In some embodiments, manufacturer/third party coupons are made available to the omni-channel coupon system 100 through back-end batch data feeds. Also in some embodiments, the server 202 may provide all available electronic coupons to the client device 206-216 of the user. In other embodiments, the server 202 may provide a subset of the electronic coupons as recommended electronic coupons to the client device 206-216. The recommended electronic coupons may be determined based on popularity. For example, as mentioned above, the database 146 may store a history of coupons clipped by customers and coupons redeemed. The coupons which are clipped and/or redeemed the most frequently by customers may be provided as recommended electronic coupons to the client device 206-216.

In another example, the database 146 may store a history of coupons clipped and redeemed by the user. When the same coupon which a user previously clipped and/or redeemed is available at a later date, the server 202 may provide the coupon as a recommended electronic coupon. Additionally, when a related coupon to coupons which a user previously clipped and/or redeemed becomes available, the server 202 may provide the related coupon as a recommended electronic coupon. A related coupon may correspond to the same product category as the previously clipped/redeemed coupon (e.g., toiletries, medication, soft drinks, etc.), may correspond to the same product, may correspond to the same manufacturer, etc. As mentioned above, the server 202 may provide a coupon alert notification to the client device 206-216 when a new coupon is available for redemption. In other embodiments, the server 202 may provide coupon alert notifications to the client device 206-216 when recommended electronic coupons become available as determined based on the coupon history of the user and other customers.

In addition to the electronic coupons provided by the server 202, the user may also obtain physical coupons and transform the physical coupons to electronic coupons by capturing images of the physical coupons via the client device. Each electronic coupon may include a code represented as a one-dimensional or two-dimensional barcode that is a coded representation of information for the electronic coupon. The coupon information may include a coupon identifier which uniquely identifies the coupon, a product identifier which uniquely identifies the product or item to which the coupon applies, a coupon expiration date, a textual description of the terms of the coupon deal being offered, a link to a coupon image, etc.

At block 604, the server 202 may receive a selection of one of the electronic coupons from the user. For example, the user may select an electronic coupon via a "Clip" button 310 as shown in FIG. 2B and the information for the coupon may be transmitted to the server 202.

When an electronic coupon is selected, the user may be prompted by the client device 206-216 to log in to a user profile by providing user identification information (e.g., a loyalty account number, a user ID, a username, a password, a PIN, a passcode, an email address, a phone number, etc.). The server 202 may then receive the user identification information from the client device (block 606) and compare the user identification information to stored user identification information associated with user profiles in a database 139, 146 (block 608). When the user identification information matches with stored user identification information associated with a particular user profile, the server 202 determines that the particular user profile belongs to the user and stores the selected electronic coupon with the user profile (block 610). On the other hand, when the user identification information does not match with stored user identification information, the user may be prompted to re-enter the user identification information until there is a match (block 606).

When the user purchases one or several products or items at an online or retail store (block 612), the user may be prompted to once again provide user identification information for identifying a user profile. For example, the POS terminal 128 (e.g., when the products or items are purchased at a retail store) or the client device 206-216 (e.g., when the products or items are purchased online) may prompt the user to provide the user identification information. Accordingly, the user may swipe, insert, or scan an identification card 232 at the POS terminal 128 such as a loyalty card having a magnetic stripe, electronic circuit (e.g., an electronic chip) or RFID tag. The POS terminal 128 may then obtain user identification information from the identification card 232 and transmit the user identification information to the server 202. The user may also manually enter in user identification information, such as a phone number at the POS terminal 128 or client device 206-216. In other embodiments, the user identification information may be stored from a previous log in.

In any event, the server 202 may identify the user profile associated with the user identification information. The POS terminal 128 may also obtain product identifiers for each purchase item (e.g., when the products or items are purchased at a retail store) or the client device 206-216 may obtain the product identifiers (e.g., when the products or items are purchased online). The POS terminal 128 or the client device 206-216 may receive coupon information for the electronic coupons stored with the user profile from the server 202. The POS terminal 128 or the client device 206-216 may then compare each of the product identifiers to product identifiers included in the coupon information for electronic coupons stored with the user profile. Accordingly, the POS terminal 128 or the client device 206-216 may identify each electronic coupon stored with the user profile having a matching product identifier with the purchase items (block 614).

Each of the matching electronic coupons may be provided to the user (e.g., via the POS terminal 128 or the client device 206-216) and the user may select which of the matching electronic coupons to redeem with the purchase. Then the server 202 or the POS terminal 128 may apply coupon deals or offers for the selected electronic coupons to the user's purchase (block 616).

In other embodiments, the server 202 or the POS terminal 128 may automatically apply coupon deals for each of the matching electronic coupons without input from the user. In some embodiments, the server 202 or the POS terminal 128 may analyze the coupon information to determine whether to automatically apply a coupon deal for a coupon to the user's purchase based on a set of rules. For example, when the expiration date for the coupon is within a threshold range of the current date, the server 202 or the POS terminal 128 may automatically apply the coupon deal for the coupon.

In some embodiments, the user may select the set of rules for automatically applying coupon deals for coupons via the client application 266, for example. More specifically, the user may be able to select the number of days until expiration when the coupon deal for the coupon should be automatically applied to subsequent purchases (e.g., within one day of expiration, within three days of expiration, etc.). The user may be able to select types of products or items for which corresponding coupon deals may automatically be applied. For example, the user may indicate that coupon deals for coupons related to toiletries and groceries should automatically be applied to subsequent purchases, but coupons deals for coupons related to larger items (e.g., appliances) should not automatically be applied.

In any event, at block 618, the server 202 may generate and transmit an order confirmation page to be displayed on the POS terminal 128 or the client device 206-216. The order confirmation page may include indications of the purchase items and applied offers for the user's purchase. The order confirmation page may also include user controls for removing each applied offer from the purchase. Then the user may review the applied offers and may remove any coupons corresponding to the offers which the user does not wish to redeem during the current purchase (e.g., via a touch command, voice command, etc.). The order confirmation page may further include a "Submit" button to submit the user's purchase order with the remaining coupons. Offers for coupons which are redeemed may be applied to the purchase and the coupons may be removed from the user's profile. Coupons which are not redeemed may remain in the user's profile for future redemption.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method for automatically applying an electronic coupon, the method executed by one or more processors programmed to perform the method, the method comprising:
   receiving, by a client device from a server device, an electronic coupon via a coupon alert notification at a mobile couponing application of the client device, wherein the electronic coupon includes a coupon identifier and is associated with an offer;
   receiving, at the client device from a user, a selection of the electronic coupon;
   selecting, by a user at the client device, a threshold range from an expiration date for the selected electronic coupon to be automatically applied;
   transmitting, by the client device to the server device, an indication of the selected electronic coupon to store with a user profile for the user;
   when the user purchases a product, obtaining, by the client device from the server device, the selected electronic coupon corresponding to the product, and automatically applying, by the client device, the offer associated with the selected electronic coupon in response to determining that a current date is within the threshold range prior to the expiration date for the selected electronic coupon, wherein the threshold range is selected by the user; and
   presenting, by the client device, an order confirmation page including an indication of the applied offer,
   wherein the coupon alert notification is received from the server device and activates the mobile couponing application to cause the client device to enable connection to the server device to display the electronic coupon.

2. The method of claim 1, wherein the server device removes the selected electronic coupon corresponding to the product from the user profile for the user.

3. The method of claim 1, further comprising:
   comparing, by the client device, the product to a plurality of products corresponding to a plurality of electronic coupons stored with the user profile to determine whether the user has an electronic coupon for the product.

4. The method of claim 3, wherein comparing the product to the plurality of products corresponding to the plurality of electronic coupons stored with the user profile includes:
   obtaining, by the client device, a product identifier for the product;
   obtaining, by the client device, a plurality of product identifiers corresponding to a plurality of coupon identifiers for the plurality of electronic coupons stored with the user profile; and
   comparing, by the client device, the product identifier for the product to the plurality of product identifiers for the plurality of electronic coupons stored with the user profile.

5. The method of claim 1, further comprising:
   presenting, by the client device, a coupon display screen including a description of the selected electronic coupon.

6. The method of claim 5, wherein the coupon display screen further includes a picture of the product corresponding to the selected electronic coupon.

7. The method of claim 5, wherein the coupon display screen further includes an indication of a distance or direction for navigation to the product in retail store corresponding to the selected electronic coupon.

8. The method of claim 1, further comprising:
obtaining, by the client device, a plurality of electronic coupons from a plurality of couponing channels.

9. The method of claim 8, wherein the plurality of couponing channels include two or more of: the mobile couponing application, a social networking webpage, a physical coupon, an email, a short message service (SMS) message, a retail webpage, a third-party web page, or a third-party application.

10. The method of claim 1, wherein the user purchases the product at an online store.

11. A client device for automatically applying an electronic coupon, the client device comprising:
one or more processors;
a communication network;
a non-transitory computer-readable memory coupled to the one or more processors, and the communication network, and storing thereon instructions that, when executed by the one or more processors, cause the client device to:
receive, via the communication network from a server device, an electronic coupon via a coupon alert notification at a mobile couponing application of the client device, wherein the electronic coupon includes a coupon identifier and is associated with an offer;
receive, from a user, a selection of the electronic coupon;
select, by a user, a threshold range from an expiration date for the selected electronic coupon to be automatically applied;
transmit, via the communication network to the server device, an indication of the selected electronic coupon to store with a user profile for the user;
when the user purchases a product, obtain, from the server device, the selected electronic coupon corresponding to the product, and automatically apply the offer associated with the selected electronic coupon in response to determining that a current date is within the threshold range prior to the expiration date for the selected electronic coupon, wherein the threshold range is selected by the user; and
present an order confirmation page including an indication of the applied offer,
wherein the coupon alert notification is received from the server device and activates the mobile couponing application to cause the client device to enable connection to the server device to display the electronic coupon.

12. The client device of claim 11, wherein the server device removes the selected electronic coupon corresponding to the product from the user profile for the user.

13. The client device of claim 11, wherein the instructions further cause the client device to:
compare the product to a plurality of products corresponding to a plurality of electronic coupons stored with the user profile to determine whether the user has an electronic coupon for the product.

14. The client device of claim 13, wherein to compare the product to the plurality of products corresponding to the plurality of electronic coupons stored with the user profile, the instructions cause the client device to:
obtain a product identifier for the product;
obtain a plurality of product identifiers corresponding to a plurality of coupon identifiers for the plurality of electronic coupons stored with the user profile; and
compare the product identifier for the product to the plurality of product identifiers for the plurality of electronic coupons stored with the user profile.

15. The client device of claim 11, wherein the instructions further cause the client device to:
present a coupon display screen including a description of the selected electronic coupon.

16. The client device of claim 15, wherein the coupon display screen further includes a picture of the product corresponding to the selected electronic coupon.

17. The client device of claim 15, wherein the coupon display screen further includes an indication of a distance or direction for navigation to the product in retail store corresponding to the selected electronic coupon.

18. The client device of claim 11, wherein the instructions further cause the client device to:
obtain a plurality of electronic coupons from a plurality of couponing channels.

19. The client device of claim 18, wherein the plurality of couponing channels include two or more of: the mobile couponing application, a social networking webpage, a physical coupon, an email, a short message service (SMS) message, a retail webpage, a third-party web page, or a third-party application.

20. The client device of claim 11, wherein the user purchases the product at an online store.

* * * * *